United States Patent
Shankar et al.

(10) Patent No.: US 10,984,117 B2
(45) Date of Patent: Apr. 20, 2021

(54) TOKEN STATE SYNCHRONIZATION

(71) Applicant: Visa International Service Association, San Francisco, CA (US)

(72) Inventors: Ramesh Shankar, San Mateo, CA (US); Brian Sullivan, Buckinghamshire (GB); Sayeed Mohammed, Foster City, CA (US); Gavin Shenker, Los Angeles, CA (US); Richard Nassar, San Mateo, CA (US); Clyde Valdez, Santa Clara, CA (US); Jonathan Hill, London (GB)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/534,916

(22) Filed: Aug. 7, 2019

(65) Prior Publication Data

US 2020/0012798 A1 Jan. 9, 2020

Related U.S. Application Data

(63) Continuation of application No. PCT/US2019/040506, filed on Jul. 3, 2019.
(Continued)

(51) Int. Cl.
*G06F 21/00* (2013.01)
*G06F 21/60* (2013.01)
(Continued)

(52) U.S. Cl.
CPC .......... *G06F 21/602* (2013.01); *G06F 21/335* (2013.01); *G06F 21/44* (2013.01); *G06F 21/629* (2013.01); *H04L 9/3213* (2013.01)

(58) Field of Classification Search
CPC .... G06F 21/602; G06F 21/629; G06F 21/335; G06F 21/44; H04L 9/3213
See application file for complete search history.

(56) References Cited

U.S. PATENT DOCUMENTS

| 10,055,578 B1 * | 8/2018 | Marquardt ............. G06F 21/44 |
| 2004/0255143 A1 * | 12/2004 | Wemyss ................ G06Q 20/26 |
| | | 726/9 |

(Continued)

FOREIGN PATENT DOCUMENTS

| KR | 10-2008-0108549 A | 12/2008 |
| WO | 2018/098492 A1 | 5/2018 |

OTHER PUBLICATIONS

"Ticketmaster Adds SafeTix™ Encrypted Tickets to Next Generation Access Control Platform", May 15, 2019, https://business.ticketmaster.com/blog/ticketmaster-adds-safetix-encrypted-tickets-to-next-generation-access-control-platform/, 4 pages.
(Continued)

*Primary Examiner* — Kendall Dolly
(74) *Attorney, Agent, or Firm* — Kilpatrick Townsend & Stockton LLP

(57) ABSTRACT

Techniques for managing an application token may include providing, by a first service provider application on a communication device to a first service provider computer, a first request for a first application token, receiving, by an account management application on the communication device from a token service computer in communication with the first service provider computer, the first application token, and storing the first application token in a token container in the account management application.

12 Claims, 12 Drawing Sheets

Related U.S. Application Data

(60) Provisional application No. 62/693,631, filed on Jul. 3, 2018.

(51) Int. Cl.
  *G06F 21/62* (2013.01)
  *G06F 21/33* (2013.01)
  *H04L 9/32* (2006.01)
  *G06F 21/44* (2013.01)

(56) References Cited

U.S. PATENT DOCUMENTS

| | | | |
|---|---|---|---|
| 2016/0092696 A1* | 3/2016 | Guglani | H04L 63/0428 726/26 |
| 2016/0094991 A1 | 3/2016 | Powell et al. | |
| 2017/0373852 A1 | 12/2017 | Cassin et al. | |
| 2018/0077142 A1 | 3/2018 | Thakkar | |

OTHER PUBLICATIONS

International Search Report and Written Opinion dated Oct. 25, 2019 for International Application No. PCT/US2019/040506, 15 pages.

\* cited by examiner

TOKEN STATE SYNCHRONIZATION

CROSS-REFERENCE TO RELATED APPLICATIONS

This application is a continuation application of PCT Application No. PCT/US2019/040506, filed on Jul. 3, 2019, which claims priority to U.S. Provisional Application No. 62/693,631, filed on Jul. 3, 2018, the contents of which are incorporated by reference herein in their entirety.

BACKGROUND

Digital means for accessing resources are increasingly popular. A communication device, such as a smart phone, may be configured with various applications for interactions such as travel, entertainment, and purchases. One example is a wallet application, which may store payment data associated with one or more payment instruments. The stored payment data may be presented via the wallet application to conduct a transaction. Another example is a ticketing application, which may store a Quick Response (QR) code which can be scanned to redeem a ticket for travel, events, or the like.

As the amount of such applications increases, integration of the applications becomes increasingly difficult. For example, there may be thousands of transportation and entertainment providers, hundreds of third-party ticket vendors, and dozens of wallet application providers. In order to enable users to use a selected wallet provider to purchase tickets through hundreds or thousands of possible channels, the each of the hundreds or thousands of providers would have to be able to communicate with each of the wallet providers.

Another drawback of many resource access applications is the use of barcodes such as QR codes, which generally must be manually selected by the user, and can be difficult to scan in to a reader at the point of access. Further, such codes are easily transferred and copied, making it difficult for a provider to maintain control over their use.

Embodiments of the invention address this and other problems, both individually and collectively.

BRIEF SUMMARY

According to some embodiments, a process for managing application tokens may include providing, by a first service provider application on a communication device to a first service provider computer, a first request for a first application token, receiving, by an account management application on the communication device from a token service computer in communication with the first service provider computer, the first application token, and storing the first application token in a token container in the account management application.

According to other embodiments, a communication device may include a memory, a processor, and a non-transitory computer-readable medium comprising instructions, which, when executed by the processor, perform the steps of: providing, by a first service provider application on the communication device to a first service provider computer, a first request for a first application token, receiving, by an account management application on the communication device from a token service computer in communication with the first service provider computer, the first application token, and storing the first application token in a token container in the account management application.

According to other embodiments, a method may include receiving, by a service provider computer from a service provider application on a communication device, a request for an application token; and transmitting, by the service provider computer, a provisioning request to a token service computer to provision the application token to a token container on an account management application on the communication device.

According to other embodiments, a service provider computer may include a memory, a processor, and a non-transitory computer-readable medium comprising instructions, which, when executed by the processor, perform the steps of: receiving, from a service provider application on a communication device, a request for an application token, and transmitting a provisioning request to a token service computer to provision the application token to a token container on an account management application on the communication device.

According to other embodiments, a method may include receiving, at a token service computer, a provisioning request to provision an application token to a token container on an account management application on a communication device, the communication device also comprising a service provider application associated with a service provider computer, and transmitting, to the account management application on the communication device from the token service computer, the application token to the token container in the account management application on the communication device.

According to other embodiments, a token service computer may include a memory, a processor, and a non-transitory computer-readable medium comprising instructions, which, when executed by the processor, perform the steps of: receiving a provisioning request to provision an application token to a token container on an account management application on a communication device, the communication device also comprising a service provider application associated with a service provider computer, and transmitting, to the account management application on the communication device from the token service computer, the application token to the token container in the account management application on the communication device.

DETAILED DESCRIPTION

Figure 1:
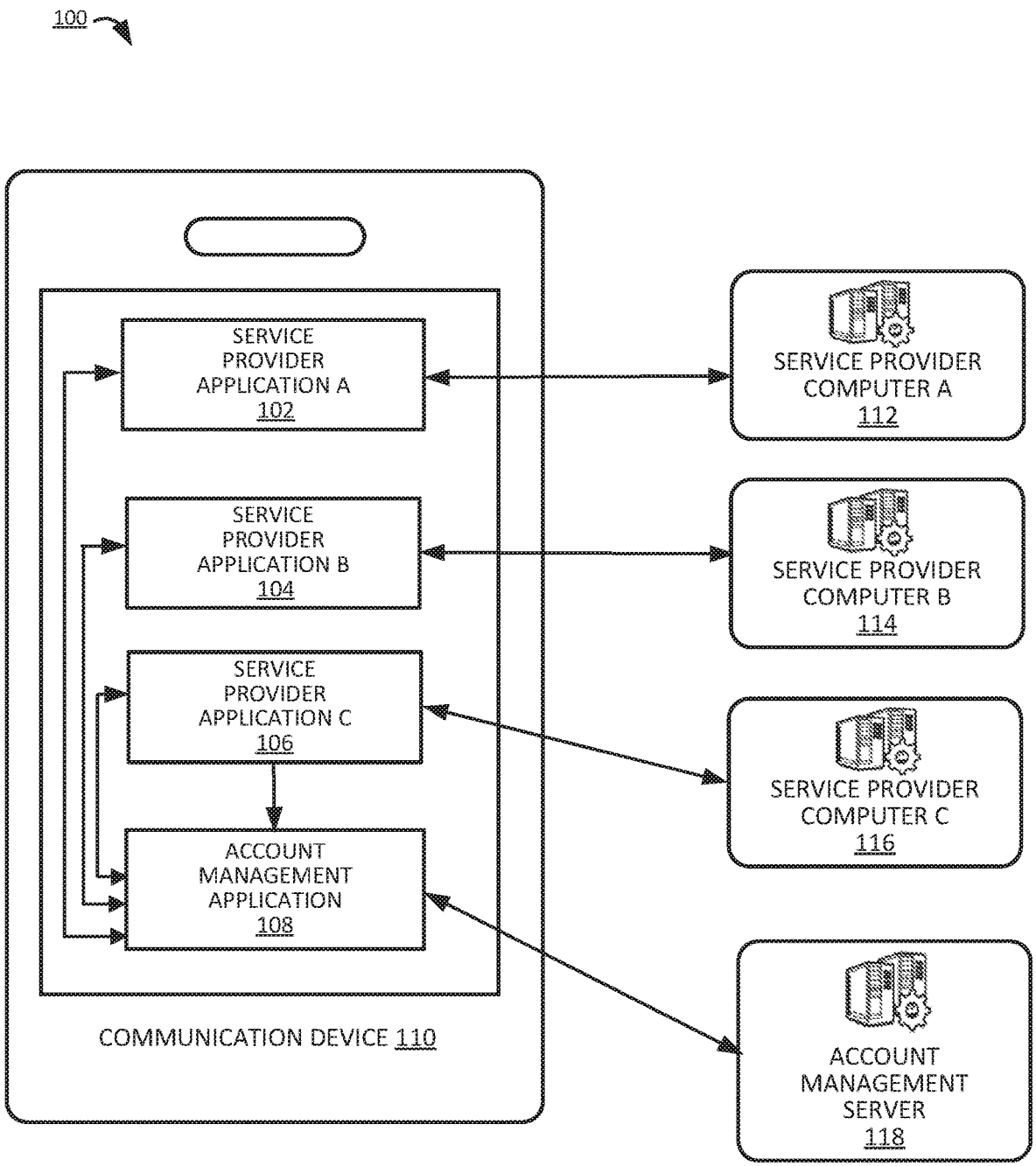
FIG. 1 illustrates a communication device interacting with a set of service provider computers and an account management server, according to some embodiments.

Techniques for managing an application token are described. In some embodiments, a first service provider application on a communication device may provide, to a first service provider computer, a first request for a first application token. An account management application on the communication device receives, from a token service computer in communication with the first service provider computer, the first application token. The first application token is stored in a token container in the account management application.

In some embodiments, a service provider can operate a token service computer to issue application specific tokens that are linked to a token container. The application specific tokens can have their own token state, and the application tokens and their respective token states can be provisioned onto a communication device of the user. When an application token stored on the communication device is used, the token state may be updated. In this manner, data security and convenience can be provided in connection with data such as ticketing information (e.g., transit and trip information), loyalty information, or other application-specific information or data.

Prior to discussing embodiments of the invention, description of some terms may be helpful in understanding embodiments of the invention.

A "communication device" may be a device that includes one or more electronic components (e.g., an integrated chip) that can communicate with another device. A "portable communication device" may be one form of a communication device that can be transported and operated by a user. A portable communication device may provide remote communication capabilities to a network, and can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, etc. Examples of portable communication devices may also include portable computing devices (e.g., laptop, netbook, ultrabook, etc.). A portable communication device may also be in the form of a vehicle (e.g., an automobile such as car) equipped with communication and/or network connectivity capabilities.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "application" may be a computer program that is used for a specific purpose.

A "time data element" may include data relating to any suitable time. For example, a time data element may be a time, date, month, year, or any suitable combination of the above. The time data element could also be derived from the time, date, month, year, or any suitable combination of the above. An encrypted time data element may be a data element that may include an encrypted time, date, month, year, and/or suitable combination of the above.

An "application token" may be an identifier used to control access to a resource or location. An application token may, for example, be an electronic ticket. As another example, an application token may be associated with a loyalty program (e.g., a loyalty credit). In some embodiments, the format of the application token may be include some indication that can be used by a receiving entity to identify the received information as an application token. In some embodiments, the format of the token may also allow a receiving entity to identify the issuer associated with the application token. For example, the format of the token may include a token issuer identifier to identify the issuer of the token.

A "token issuer," "token provider," "token service computer," or "token service system" can include a system that services tokens. In some embodiments, a token service computer can facilitate requesting, determining (e.g., generating) and/or issuing tokens, as well as maintaining an established mapping of tokens to other data in a repository (e.g., a token vault). In some embodiments, the token service computer may establish a token assurance level for a given token to indicate the confidence level of the token binding. The token service computer may include or be in communication with a token vault where the generated tokens are stored. The token service computer may support token processing of transactions submitted using tokens. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

An "access device" may be any suitable device for communicating with a merchant computer or transaction processing network (e.g., payment processing network), and for interacting with a consumer communication device. An access device may generally be located in any suitable location, such as at the location of a merchant. An access device may be in any suitable form. Some examples of access devices include entry gates, point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a consumer communication device. In some embodiments, where an access device may comprise a POS terminal, any suitable POS terminal may be used and may include a reader, a processor, and a computer-readable medium. A reader may include any suitable contact or contactless mode of operation. For example, exemplary readers can include radio frequency (RF) antennas, optical scanners, bar code readers, or magnetic stripe readers to interact with a consumer communication device.

"Provisioning" may include a process of providing data for use. For example, provisioning may include providing, delivering, or enabling a token on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

A "user" may include an individual that operates a communication device to conduct a transaction. The user may also be referred to as a consumer or account holder.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include Advance Encryption Standard (AES), Data Encryption Standard (DES), Triple Data Encryption Standard/Algorithm (TDES/TDEA), or other suitable algorithms. The key used in the cryptographic algorithm can be of any suitable lengths (e.g., 56-bit, 128-bit, 169-bit, 192-bit, 256-bit, etc.). In some embodiments, a longer key length may provide a more secure encryption that is less susceptible to hacking.

A "digital signature" or "cryptographic signature" may include a type of electronic signature that encrypts documents with digital codes that are particularly difficult to duplicate. A digital signature may include data used to provide assurance or evidence as to the origin and identity of an electronic record or message. Digital signatures can be based on public key cryptography (i.e. asymmetric cryptography). Digital signatures may be generated using a public key algorithm such as Rivest-Shamir-Adleman (RSA). To create a digital signature, signing software may be used to create a one-way hash of electronic data that is to be signed by a signing entity. A private key of the signing entity is then used to encrypt the hash and form the digital signature. In other cases, a symmetric key of a symmetric key pair can be used to create a digital signature.

The term "validation" may include the act of checking or affirming that information is legitimate. An example may be the act of checking that a digital signature appended to an electronic record is, in fact, legitimate and was signed by the entity that alleges creation of the digital signature. In some embodiments, digital signatures may be validated according to a verification algorithm in conjunction with a signing entity's public key. In other cases, if underlying data was signed using a symmetric key of a symmetric key pair, the signature can be validated with the corresponding symmetric key.

An "authorization request message" may be a message that requests authorization for an interaction such as a transaction. In some embodiments, an authorization request message may be an electronic message that is sent to a payment processing network and/or an issuer of a ticket, token, payment card, etc. to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, an authorization response message can be generated by an issuing financial institution, service provider, or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

"Authorization processing" or "authorization operations" may include at least generating and sending an authorization request message and/or authorization response message. Authorization processing may further include determining whether to authorize the transaction.

A "transaction processing system" may include a network of one or more devices that can process and route transaction request messages. An exemplary transaction processing system may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 illustrates a communication device 110 in communication with a set of service provider computers 112-116 and an account management server 118, according to some embodiments. The service provider computers shown in FIG. 1 include service provider computer A 112, service provider computer B 114, and service provider computer C 116.

The service provider computers 112-116 may correspond to different service providers or service provider agents. As examples, the service providers may facilitate access to a location or event. Example service providers include a transit agency (e.g., providing rail or bus services), an airline, and a movie theater. Service provider agents may facilitate resource access on behalf of multiple different service providers (e.g., a website which sells airline tickets across different airlines, or a ticket agency).

Each of the service provider computers (112-116) is associated with a respective service provider application (102-106). Service provider A 112 is associated with service provider application A 102. Service provider computer B 114 is associated with service provider application B 104. Service provider computer C 116 is associated with service provider application C 106. Service provider applications 102-106 may be used to manage access to a resource. For example, a user may interact with a service provider application to purchase a ticket for travel.

As illustrated in FIG. 1, the service provider applications 102-106 are in communication with an account management application 108. The account management application 108 may be used to centrally manage data for facilitating access to a resource across the service provider applications 102-106. For example, the account management application 108 may be a digital wallet, and may store digital currency, tickets, and the like, via a set of service provider applications.

Each service provider application 102-106 may use different formats, data, and data structures. In order for the service provider applications 102-106 to utilize the functions of the account management application 108, each service provider application must integrate to the account management application 108, and the account management application 108 must be able to process the data provided by each service provider application 102-106.

Figure 2A:
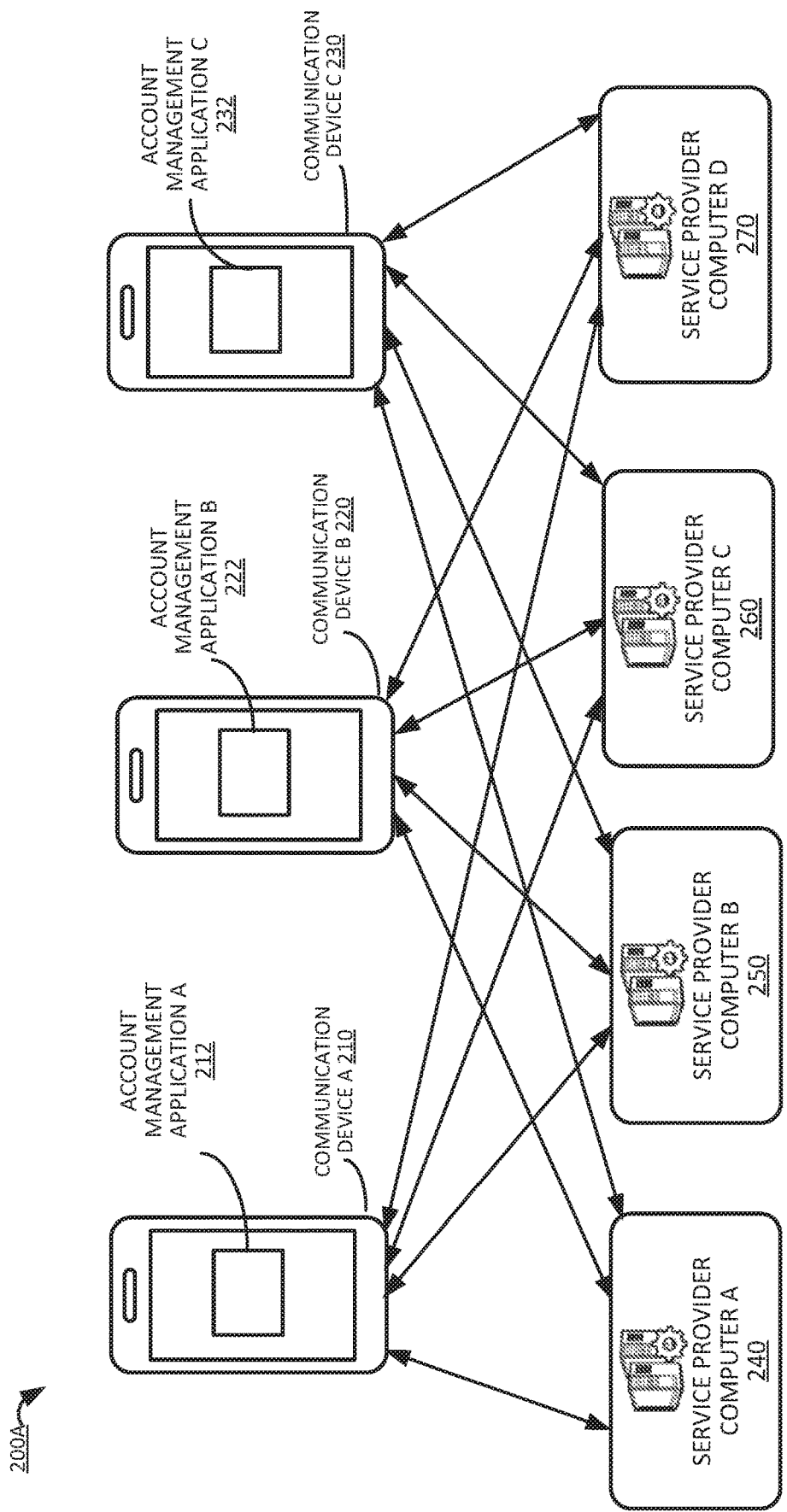
FIGS. 2A-2B illustrate communication devices interacting with a set of service provider computers, according to some embodiments.

Turning to FIG. 2A, multiple account management application providers exist. Different communication devices/users may select different account management applications. For example, different communication device manufacturers may be compatible with different respective native account management applications. As another example, a user may select one or more preferred account management applications to install on a communication device.

As illustrated in FIG. 2A, three different communication devices, communication device A 210, communication device B 220, and communication device C 230, are each configured with a different respective account management application. Communication device A 210 includes account management application A 212. Communication device B 220 includes account management application B 222. Communication device C 230 includes account management application C 232.

Each account management application (account management application A 212, account management application B 222, and account management application C 232) is configured to store data associated with various service providers. The account management applications 212, 222, 232 are communicatively coupled to service provider computer A 240, service provider B 250, service provider C 260, and service provider D 270. The account management applications 212, 222, 232 may need to interact with any given service provider computer to facilitate providing a service.

As a specific example, a user operates communication device A 210, which is configured with a particular electronic wallet, account management application A 212. The user travels frequently by train, and purchases train tickets through several different service providers. In order to use the electronic wallet to manage all these train tickets, account management application A includes programming configured to interface with various service provider computers. Service provider computer A is operated by a local light-rail service. Service provider computer B 250 is operated by an intercity train service. Service provider computer C 260 is operated by a travel agency. Service provider computer D 270 is operated by a travel aggregator service that allows users to compare prices of different providers. The user purchases tickets from each of these providers at different times. Accordingly, account management application A includes code configured to interface with each service provider computer (A 240, B 250, C 260, and D 270), to accept tickets in the various formats provided by the respective service provider computers, and to communicate with the respective service provider computers to validate and redeem the tickets. Likewise, the service providers must integrate to the various account management applications. For example, communication device B has a different wallet installed than communication device A (account management application B 222 vs account management application A 212), and communication device C has yet another electronic wallet installed (account management application C 232). Each service provider computer must include functionality to interface with and understand each of these account management applications.

Figure 2B:
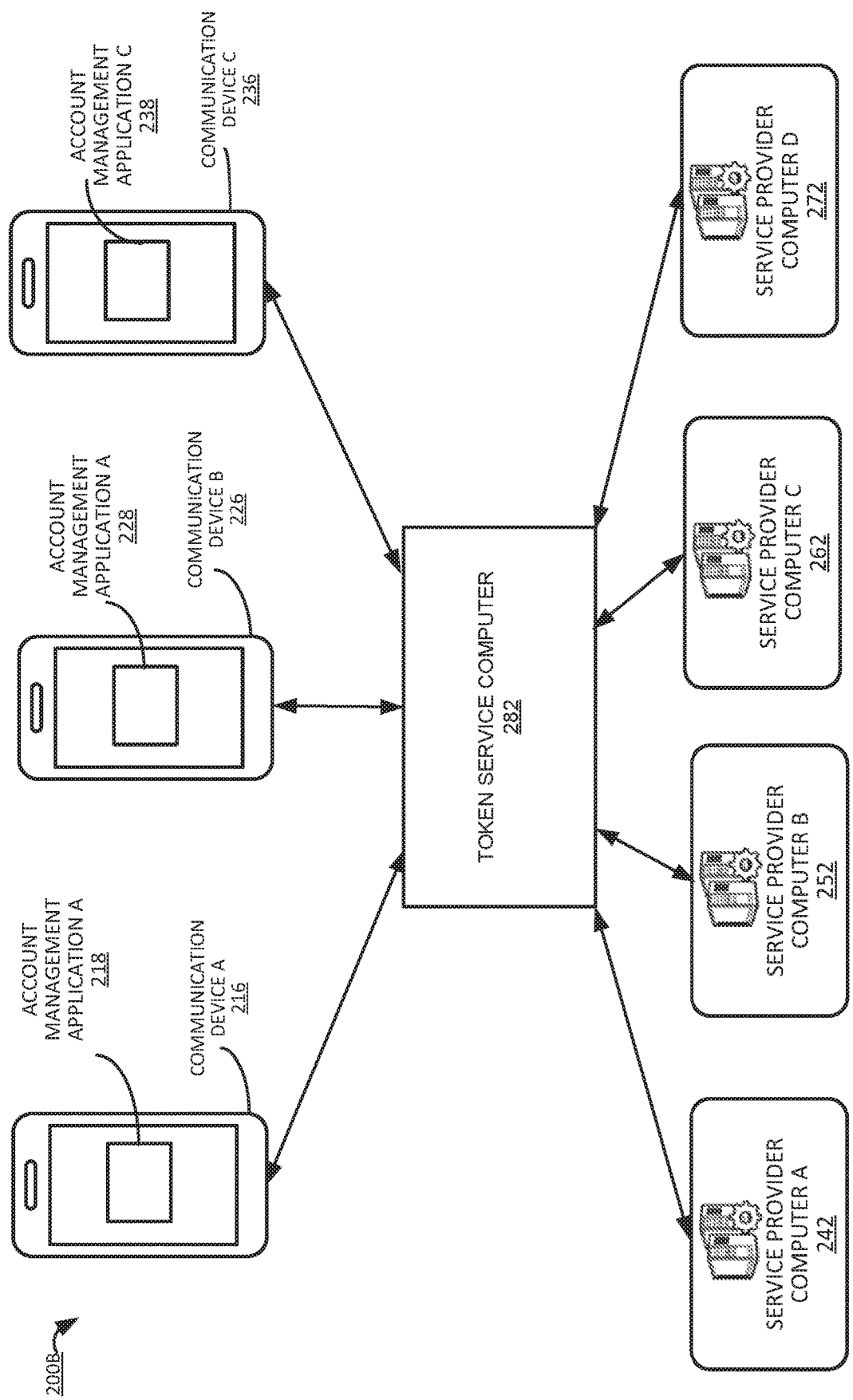

FIG. 2B illustrates a system 200B with a token service computer 282 (e.g., operated by a token service provider) facilitating integration of multiple account management applications and service provider computers according to embodiments. System 200B includes communication device A 216, communication device B 226, communication device C 236, token service computer 282, service provider computer A 242, service provider B 252, service provider C 262, and service provider computer D 272.

Each of the communication devices includes a respective account management application. Communication device A 216 includes account management application A 218. Communication device B 226 includes account management application B 228. Communication device C 236 includes account management application C 238.

In contrast to the system of FIG. 2A, in the system of FIG. 2B, by way of the token service computer 282, the account management applications 218, 228, 238 can communicate with one interface, the token service computer 282, rather than adapting to the various service provider computers 242, 252, 262, 272. Similarly, the service provider computers 242, 252, 262, 272 can communicate with the token service computer 282. Accordingly, the use of the token service computer streamlines communications between the parties.

Figure 3:
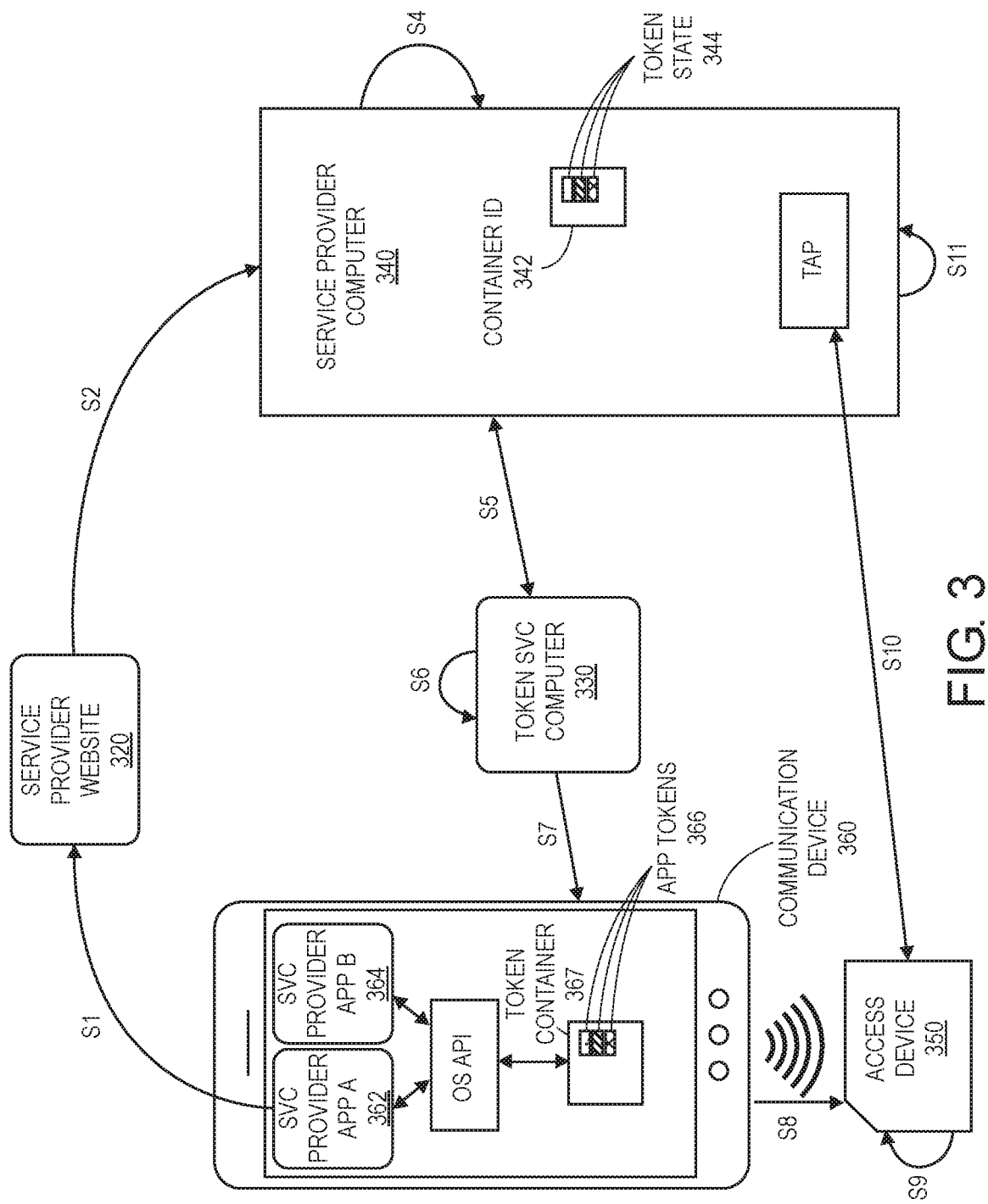
FIG. 3 illustrates an application token provisioning and redemption process and system, according to some embodiments.

FIG. 3 illustrates an overview of an interaction between a communication device 360, token service computer 330, service provider website 320, access device 350, and service provider computer 340, according to some embodiments. The service provider computer 340, access device 350, and service provider website 320 may be associated with a service provider such as a transit provider, concert venue, travel agency, ticket agency, or the like. For example, the service provider computer 340 is a server computer associated with a railway, U.S.A. Railways. The service provider website 320 is U.S.A. Railways' public-facing website. The access device 360 is an access terminal at a gate for entering a particular platform of a train station operated by U.S.A. Railways. The communication device 360 may be, for example, a near-field-communication-enabled mobile phone. The communication device 360 includes service provider application A 362 (which corresponds to U.S.A. Railways) and service provider application B 364 (which corresponds to another service provider).

Initially, a user interacts with the communication device 360 to purchase a transit ticket on U.S.A. Railways. The user may purchase the transit ticket via the service provider application A 362 and/or via the service provider website 320.

At step S1, the communication device 360 application may transmit ticket purchase information to the service provider website 320, in the event the user purchases the ticket via the application 362. Alternatively, the user may interact directly with service provider website 320 via a browser on the communication device 360. At step S2, the service provider website 320 transmits the ticket purchase information to the service provider computer 340.

At step S3, the service provider computer 340 processes the ticket purchase, which may involve coordinating with external transaction processing systems and/or issuers to confirm purchase details and debit an account. The service provider computer 340 may issue an application token 366 representing the ticket and keep a record of the application token 366.

At step S5, the service provider computer 340 may initiate fulfillment via the token service computer 330. The service provider computer 340 may transmit information about the application token 366 to the token service computer 330.

At step S6, the token service computer 330 may prepare a token container 367 associated with the application token 366. In some embodiments, the token service computer 330 generates a token container 367 to provision to the communication device 360. The token service computer 330 may retrieve the application token 366 received from the service provider computer 340. The token service computer 330 may place the application token in the token container. The token service computer 330 may generate and stores a container identifier (ID) 342 in association with the token container 367. The container ID 342 may be, for example, a sixteen digit number, name, or the like, characterizing the token container 367. The container ID 342 may be stored to the token service computer 330 and/or service provider 340. The token service computer 330 may further establish and store a token state 344 in connection with the application token 366. The token state 344 may, correspond to a state of the application token. Example token states 344 include— newly generated, redeemed, and value added.

At step S7, the token service computer 330 may provision the token container 367 and/or an application token 366 to the communication device 360. The token service computer 330 transmits the token container 367 and the application token 366 to the communication device 360 via any suitable form of wireless or wired communication.

The communication device 360 stores the token container 367, which, in turn, stores application tokens 366. The application tokens are associated with access to different locations or resources. For example, one application token corresponds to an airline ticket for a California Airways flight on Jul. 3, 2019, another application token corresponds to a train ticket for a U.S.A. Railways journey on Jul. 4, 2019, and a third application token corresponds to a concert ticket for a particular concert. Application tokens associated with different service providers may be stored in a same token container 367. Alternatively, multiple token containers may be provisioned, e.g., one per service provider or service provider application.

At step S8, the communication device 360 interacts with the access device 350 to obtain access to a location or resource. In this specific example, the user tags their short-wave-communication-enabled phone to a gate to access a train platform. The communication device 360 transmits the application tokens 366 to the access device 350

At step S9, the access device 350 checks headers of the application tokens 366, and identifies the application token 366 which corresponds to U.S.A. Railways. The access device 350 transmits a signal, causing a gate to open and grant the user access to the train platform. The access device 350 may transmit confirmation back to the communication device 360, causing the communication device 360 to mark the application token 366 for the U.S.A. Railways journey as used.

At step S10, the access device 350 transmits information to the service provider computer 340. The transmitted information specifies that the application token for the U.S. Rail journey has been redeemed.

At step S11, The service provider computer 340 updates its records database to indicate that the application token has been redeemed. Updating the records may include modifying a stored token state 344 associated with the redeemed application token 366.

Figure 4A:
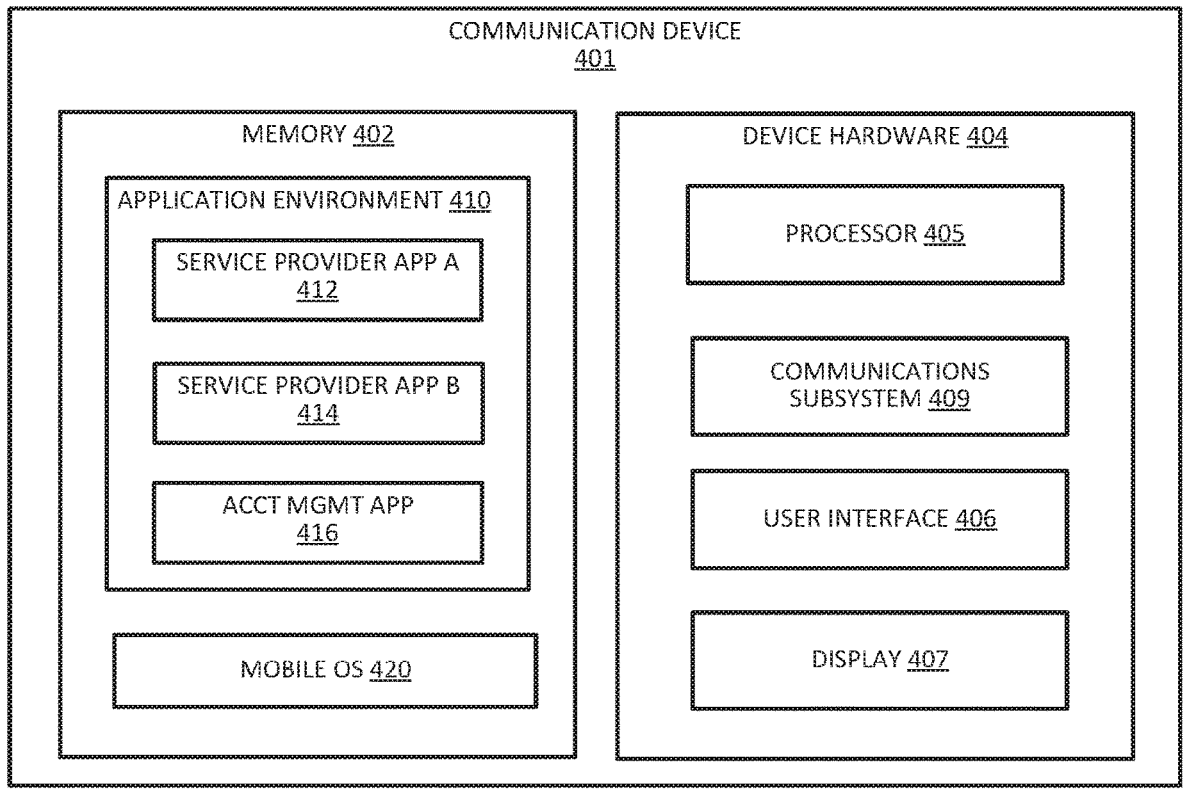
FIGS. 4A-4B illustrate a block diagram of a communication device, according to some embodiments.

FIG. 4A illustrates a block diagram of a communication device 401, according to some embodiments. Communication device 401 may include device hardware 404 coupled to a memory 402. Device hardware 404 may include a processor 405, a communications subsystem 409, user interface 406, and a display 407 (which may be part of user interface 406).

Processor 405 can be implemented as one or more integrated circuits (e.g., one or more single core or multicore microprocessors and/or microcontrollers), and is used to control the operation of portable communication device 401. Processor 405 can execute a variety of programs in response to program code or computer-readable code stored in memory 402, and can maintain multiple concurrently executing programs or processes.

Communications subsystem 409 may include one or more transceivers and/or connectors that can be used by communication device 401 to communicate with other devices and/or to connect with external networks such as the Internet. In some embodiments, the communications subsystem 409 may further include a contactless element, which is typically implemented in the form of a semiconductor chip (or other data storage element) with an associated wireless transfer (e.g., data transmission) element, such as an antenna. Contactless element may be coupled to (e.g., embedded within) the communication device 401 and data or control instructions that are transmitted via a cellular network may be applied to the contactless element by means of a contactless element interface (not shown). Contactless element may be capable of transferring and receiving data using a short range wireless communication capability. Communications subsystem 409 may comprise components to both be the interrogator device (e.g. receiving data) and the interrogated device (e.g. sending data). Thus, the communication device 401 may be capable of communicating and transferring data or control instructions via both cellular network (or any other suitable wireless network—e.g. the Internet or other data network) and short range communications. The communication device 401 may also include an antenna for wireless data transfer (e.g., data transmission).

User interface 406 can include any combination of input and output elements to allow a user to interact with and invoke the functionalities of communication device 401. In some embodiments, display 407 may be part of user interface 406. The display 407 and user interface 406 may allow a user to see information and messages. The communication device may further include input elements to allow a user to input information into the device, a speaker to allow the user to hear voice communication, music, etc., and a microphone to allow the user to transmit her voice through the communication device 401.

Memory 402 can be implemented using any combination of any number of non-volatile memories (e.g., flash memory) and volatile memories (e.g., DRAM, SRAM), or any other non-transitory storage medium, or a combination thereof media. Memory 402 may store a mobile operating system 420 and an application environment 410 where one or more applications reside to be executed by processor 405.

Application environment 410 may include applications that are used to manage application tokens. In some embodiments, the applications may include service provider application A 412, service provider application B 414, and account management application 416.

The service provider applications (A 412 and B 414) may include functionality for providing access to services or other resources. Examples of service provider applications include ticketing applications, transit applications, and merchant applications. The service provider applications may be communicatively coupled to respective service provider computers for performing back-end functions such as selling or redeeming tickets.

The account management application 416 may include functionality for managing one or more accounts. Examples of account management applications 416 include mobile or digital wallet applications, issuer applications, and banking applications. The account management application 416 may provide a single application for storing and managing functions associated with service provider application A 412 and service provider application B 414.

The memory 402 may comprise code, executable by the processor 405, to implement a method comprising: providing, by a first service provider application on a communication device to a first service provider computer, a first request for a first application token; receiving, by an account management application on the communication device from a token service computer in communication with the first service provider computer, the first application token; and storing the first application token in a token container in the account management application.

Figure 4B:
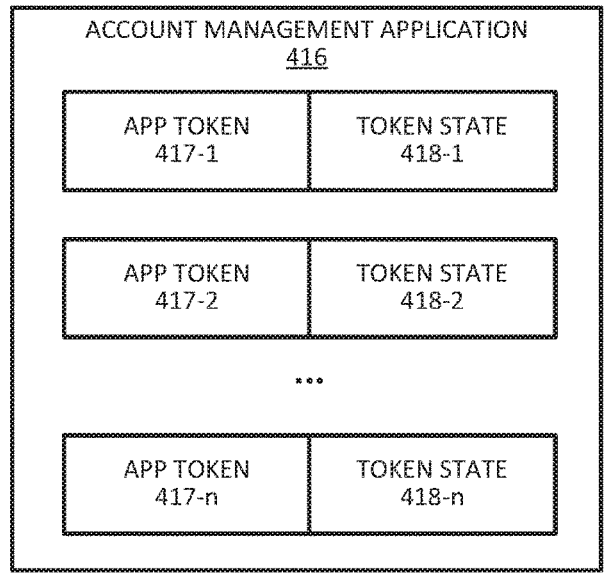

FIG. 4B illustrates a detailed view of the account management application 416, according to some embodiments. The account management application 416 may store application tokens 417-1 to 417-n and token states 418-1 to 418-n. The account management application 416 may store the application tokens 417-1 to 417-n and token states 418-1 to 418-n securely, e.g., using cryptography and/or a secure hardware element.

In some embodiments, the application tokens 417-1 to 417-n are digital tickets associated with a service or good that has been purchased. When a user obtains multiple services or goods from a service provider, the services or goods can further be linked to application-specific tokens. For example, when obtaining multi-leg transit tickets, each ticket can be issued as a digital ticket and be represented by an application token. Alternatively, or additionally, the application tokens may represent loyalty data (e.g., reward points for frequent shoppers). Each application token 417-1 to 417-n may also have its own respective token state 418-1 to 418-n. Each token state may represent one or more token attributes of the corresponding application token. Continuing with the above example related to a transit system, each token state may represent attributes such as whether the ticket for the leg of the trip has been used or not.

Figure 6:
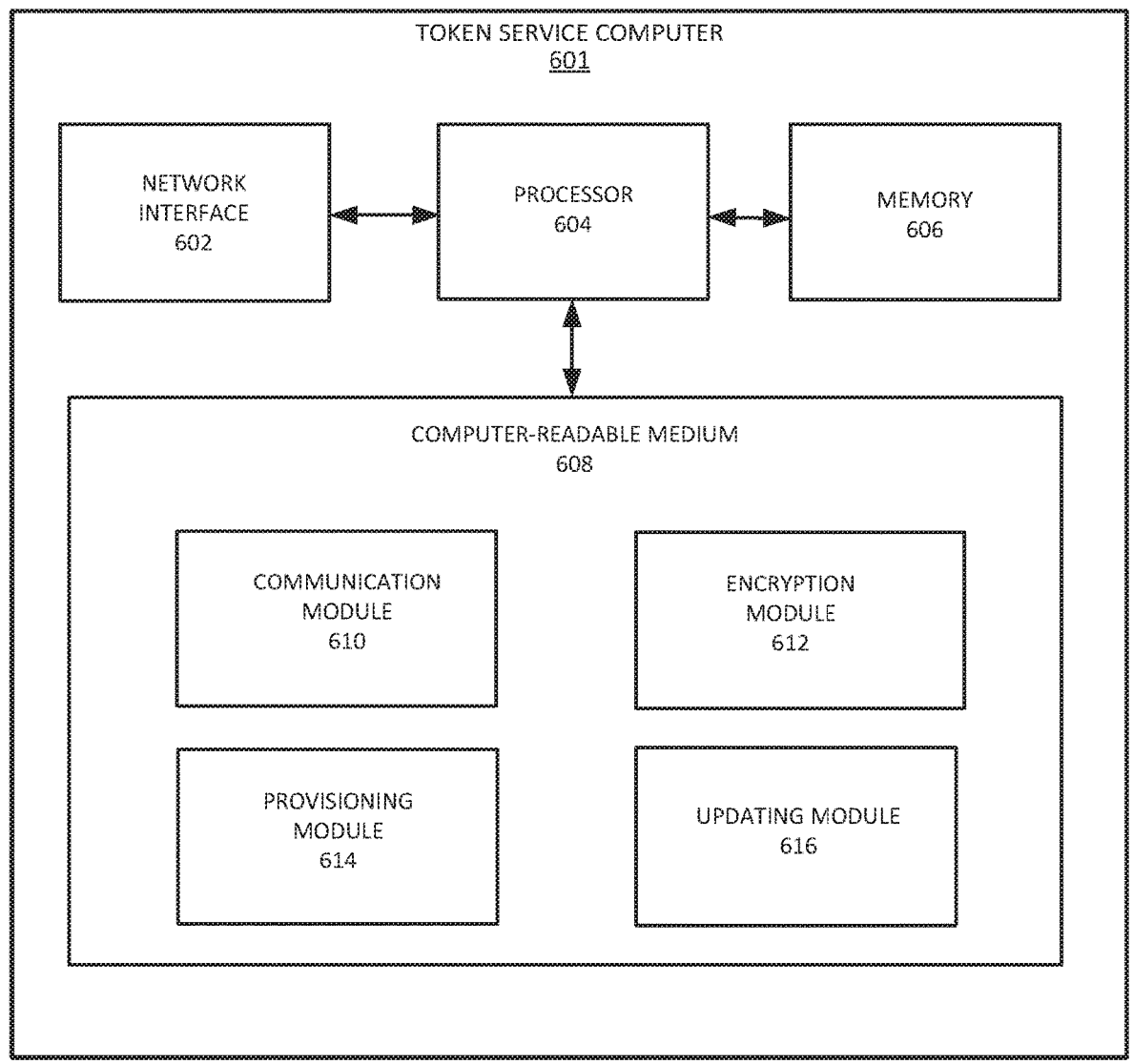
FIG. 6 illustrates a block diagram of a token service computer, according to some embodiments.

Communication device 401 may store the provisioned application tokens 417-1 to 417-n and associated token states 418-1 to 418-n in a digital container accessible by the account management application 416. The provisioned account tokens 417-1 to 417-n can be used to access a good or a service with the associated service provider. For example, a provisioned account token can be provided from communication device 401 to an access device at a transit gate to gain access to the transit system. As the application token is being spent, the service provider may update the token state of the application token on communication device 401. For example, when a ticket is used up, the service provider may modify the token state of the token representing the ticket from the unused state to the used state. In some embodiments, the service provider may update the token state on communication device 401 by sending a state update request to a token service computer (e.g., as shown in FIG. 6), and the token service computer may update its own token state and synchronize the update to communication device 401.

The account management application 416 may further store logs of when and where interactions associated with the application tokens occur. Thus, the integrity of the application token can be validated at redemption.

Figure 5:
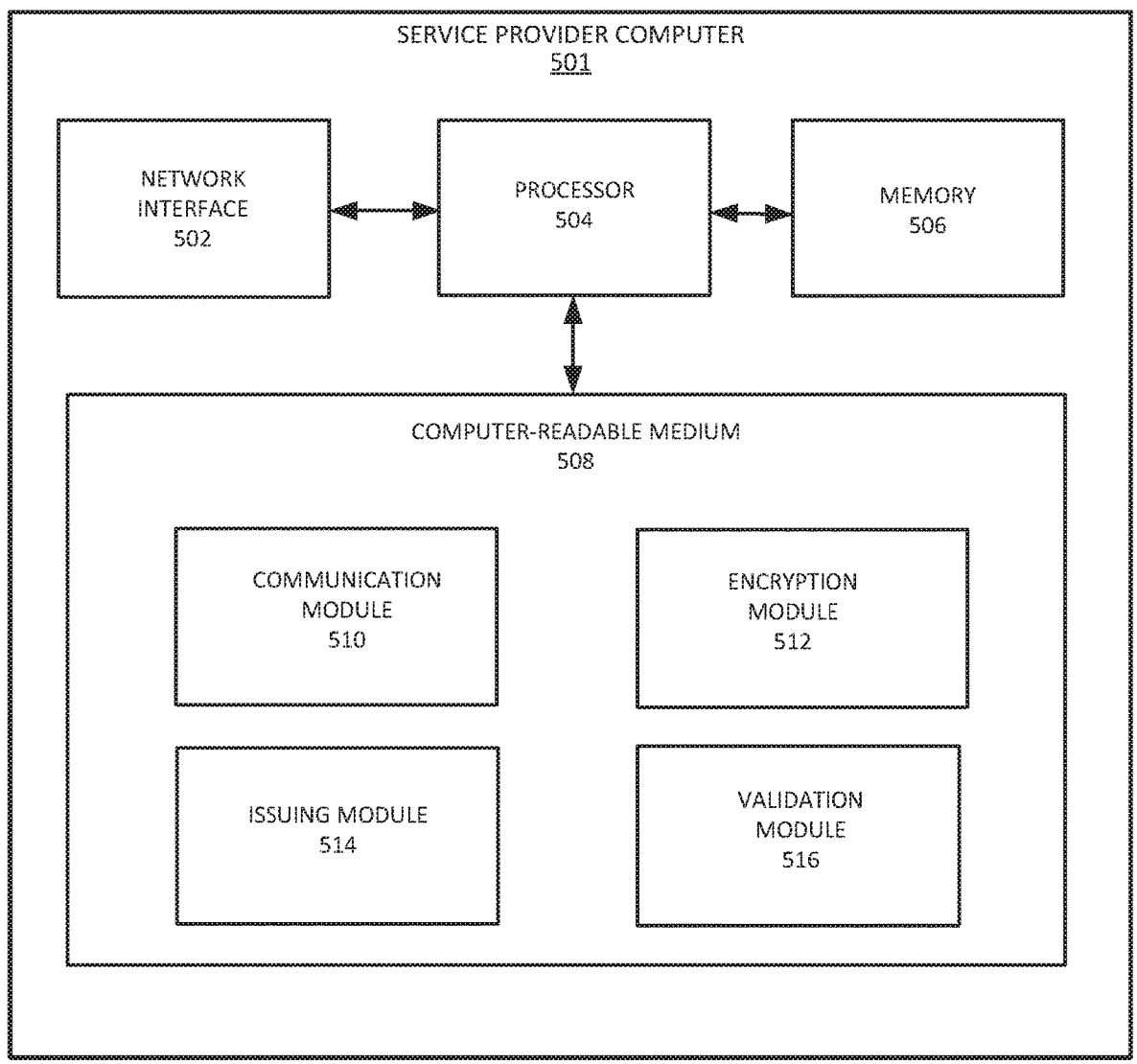
FIG. 5 illustrates a block diagram of a service provider computer, according to some embodiments.

FIG. 5 illustrates a block diagram of a service provider computer 501, according to some embodiments. Service provider computer 501 includes a network interface 502, processor 504, memory 506, and computer-readable medium 508.

The processor 504 may be implemented as one or more integrated circuits (e.g., one or more single core or multicore microprocessors and/or microcontrollers). The processor 504 may be used to control the operation of the service provider computer 501. The processor 504 can execute a variety of programs in response to program code or computer-readable code stored in memory 506. The processor 504 may include functionality to maintain multiple concurrently executing programs or processes.

The network interface 502 may be configured to connect to one or more communication networks to allow the service provider computer 501 to communicate with other entities such as a resource provider computer, transport computers, routing administration interface, etc. For example, communication with the transport computers can be direct, indirect, and/or via an application programming interface (API).

The memory 506 may be implemented using any combination of any number of non-volatile memories (e.g., flash memory) and volatile memories (e.g., DRAM, SRAM), or any other non-transitory storage medium, or a combination of media.

The computer-readable medium 508 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 208 may be any combination of such storage or transmission devices.

The computer-readable medium 508 may comprise software code stored as a series of instructions or commands. The computer-readable medium 508 comprises code, executable by the processor 504, to implement methods as described herein. The computer-readable medium 508 may comprise a communication module 510, an encryption module 512, an issuing module 514, and a validation module 516. Each of these modules may include code configured to perform the functions described below in conjunction with the processor 504.

The communication module 510 may comprise code that causes the processor 504 to generate messages, forward messages, reformat messages, and/or otherwise communicate with other entities.

The encryption module 512 may include any suitable encryption algorithms to encrypt data in embodiments of the invention. Suitable data encryption algorithms may include DES, triple DES, AES, etc. The encryption module 512 may also store encryption keys that can be used with such encryption algorithms. The other keys of any corresponding key pairs may be stored encryption module 612 in the token service computer 601. The encryption module 512 may utilize symmetric or asymmetric encryption techniques to encrypt and/or verify data. The token service computer and the service provider computer 501 may have (store) respective cryptographic keys of a cryptographic key pair.

The issuing module 514 may comprise code that causes the processor 504 to generate an application token. The issuing module may receive requested details such as journey, event, or item data. The issuing module may generate an application token corresponding to the requested details. The issuing module may further comprise code for processing payment data to process account information for purchasing the application token (which may be done in cooperation with one or more external payment processing networks and/or banks).

The validation module 516 may comprise code that causes the processor 504 to validate an application token. Validating an application token may include one or more of—verifying stored application token records, verifying a digital signature of the application token, and or processing received verification data. The validation module may further comprise code that causes the processor 504 to update a token state associated with an application (e.g., by marking the application token as used, expired, etc.).

FIG. 6 illustrates a block diagram of a token service computer 601, according to some embodiments. Token service computer 601 includes a network interface 602, processor 604, memory 606, and computer-readable medium 608.

The processor 604 may be implemented as one or more integrated circuits (e.g., one or more single core or multicore microprocessors and/or microcontrollers). The processor 604 may be used to control the operation of the token service computer 601. The processor 604 can execute a variety of programs in response to program code or computer-readable code stored in memory 606. The processor 604 may include functionality to maintain multiple concurrently executing programs or processes.

The network interface 602 may be configured to connect to one or more communication networks to allow the gateway server 600 to communicate with other entities such as a resource provider computer, transport computers, routing administration interface, etc. For example, communication with the transport computers can be direct, indirect, and/or via an API.

The memory 606 may be implemented using any combination of any number of non-volatile memories (e.g., flash memory) and volatile memories (e.g., DRAM, SRAM), or any other non-transitory storage medium, or a combination of media.

The computer-readable medium 608 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 608 may be any combination of such storage or transmission devices.

The computer-readable medium 608 may comprise software code stored as a series of instructions or commands. The computer-readable medium 608 comprises code, executable by the processor 604, to implement methods as described herein. The computer-readable medium 608 may comprise a communication module 610, an encryption module 612, a provisioning module 614, and an updating module 616. Each of these modules may include code configured to perform the functions described below in conjunction with the processor 604.

The communication module 610 may comprise code that causes the processor 504 to generate messages, forward messages, reformat messages, and/or otherwise communicate with other entities.

The encryption module 612 may include any suitable encryption algorithms to encrypt data in embodiments of the invention. Suitable data encryption algorithms may include DES, triple DES, AES, etc. The encryption module 612 may also store encryption keys that can be used with such encryption algorithms. The other keys of any corresponding key pairs may be stored encryption module 512 in the service provider computer 501. The encryption module 612 may utilize symmetric or asymmetric encryption techniques to encrypt and/or verify data. The token service computer 601 and the service provider computer 501 may have (store) respective cryptographic keys of a cryptographic key pair.

The provisioning module 614 may comprise code that causes the processor 604 to generate a token container. The provisioning module may, for example, include code configured to generate a token container for a particular communication device and/or application token.

The updating module 616 may comprise code for updating a token container and/or application token. The updating module may include code configured to add application token(s) to a token container. The updating module 516 may include code configured to update a token state associated with an application token (e.g., by marking an application token as used, adding value, adding a leg to a journey, updating loyalty data, etc.).

In some embodiments, the token service computer may include a token vault (not shown). By way of example, the token vault may store application tokens. Each application token may also be stored in association with its own respective token state (as described above with respect to FIG. 4). The application tokens and corresponding token states can be stored at the token vault, and be provisioned to a communication device (e.g., as illustrated and described with respect to FIG. 4). When an application token is redeemed (e.g., for travel, access to an event, or the like) the token state of the application token may be updated in the token vault.

Figure 7:
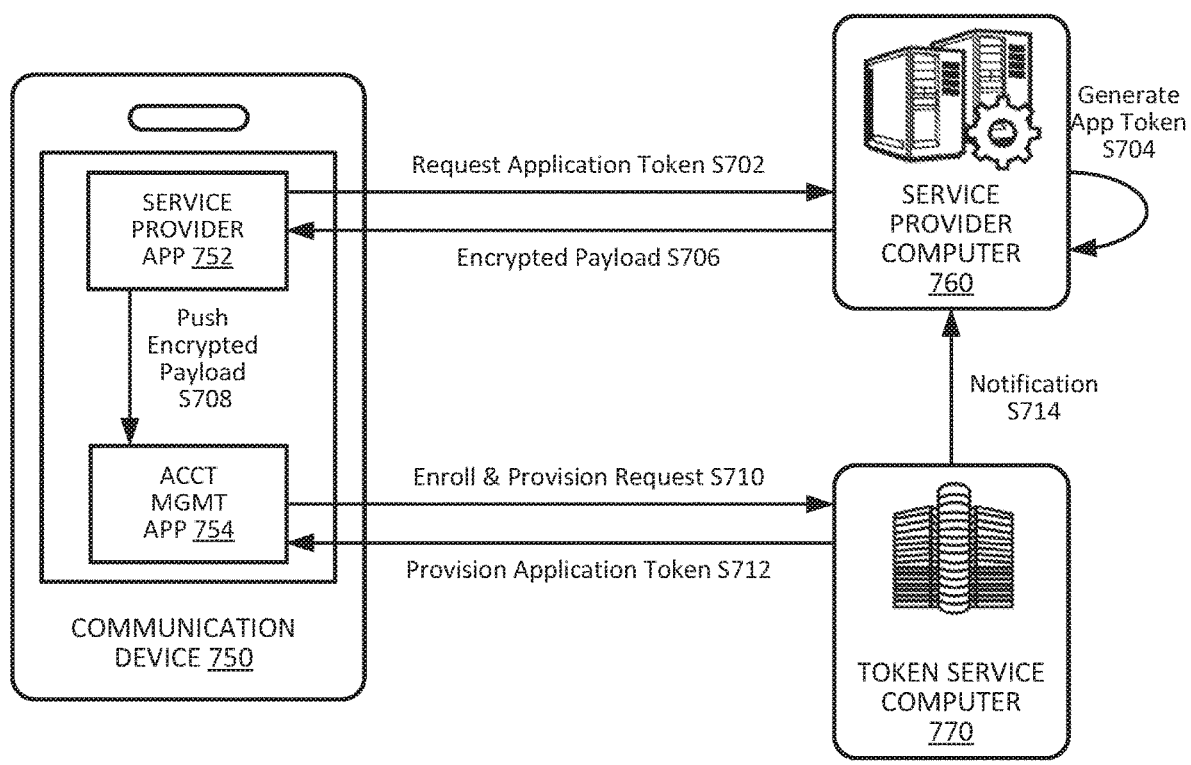
FIG. 7 illustrates an application token provisioning process, according to some embodiments.

FIG. 7 illustrates an application token provisioning process 700, according to some embodiments. Communication device 750 may have installed therein an account management application 754 such as a mobile wallet application and a service provider application 752 such as a merchant or transit application associated with service provider computer 760. The application token provisioning process 700 can be a first time process to provision application tokens to communication device 750.

Initially, a user may interact with communication device 750 to purchase an application token. The user may select an application token for purchase, e.g., via service provider application 752 and/or a web browser in communication with a service provider website. As another example, the user may purchase an application token via a kiosk, e.g., at a subway station or airport. The service provider application 752 may determine whether an application token and/or token container exists on the communication device 750. Service provider application 752 may, for example, query the account management application 754 to determine whether account tokens have previously been provisioned and/or whether a token container is currently stored on the account management application 754 or elsewhere on the communication device 750. Alternatively, or additionally, service provider application 752 may search records stored within the service provider application 752 and/or service provider computer 760.

At step S702, service provider application 752 may transmit a request for an application token to service provider computer 760. The request may include details pertaining to the application token (e.g., one ticket for rail travel from Amsterdam to Munich). The request may include payment information such as an account number to use to pay for the application token. In some embodiments, the request may further include an indication that this is a first application token request. The request may be transmitted over a wired or wireless connection between the communication device 750 and the service provider computer 760. The service provider computer 760 may receive, from service provider application 752, the request for the application token.

At step S704, service provider computer 760 may verify the user, communication device 750, and/or payment information, and generate the application token. The application token may, for example, be generated in the form of a digital ticket. The application token may include information about the access to grant (e.g., one rail journey, access to a particular concert, access to a particular building, etc.). The application token may include information characterizing the service provider (e.g., the application token may include a header specifying that the service provider is Travel Corp.). The application token may be in a format and/or size specific to the service provider. As examples, one service provider may store the application token as a different type of file than other service providers, and different service providers may set up different fields for storing different types of information (e.g., one may store date, time, service provider ID, as a first three header fields, while another service provider may store location, amount, token ID, as the first three header fields).

Service provider computer 760 may package the generated application token in an encrypted payload (e.g., JavaScript Object Notation (JSON) web encryption payload). In some embodiments, the service provider computer 760 may store one encryption key (e.g., an ephemeral public Elliptic-curve cryptography (ECC) key) and the token service computer 770 may store another corresponding encryption key. The service provider computer 760 may encrypt the application token. The service provider computer 760 may generate an encrypted payload including at least the encrypted application token.

At step S706, service provider computer 760 transmits the encrypted payload to service provider application 752 installed on communication device 750. The service provider application 752 receives the encrypted payload.

At step S708, the service provider application 752 pushes the encrypted payload to the account management application 754. The account management application may not be able to decrypt/view the contents of the encrypted packet at this point.

At step S710, account management application 254 may transmit an provisioning request to token service computer 770. The account management application 254 may further request, from the token service computer, 770, enrollment for the user and/or communication device.

The token service computer 770 may decrypt the encrypted payload upon receipt. The token service computer 770 and the service provider computer 760 may share symmetric encryption keys that will allow them to encrypt and decrypt application tokens or portions thereof. In other embodiments, the token service computer 770 and the service provider computer 760 may respectively utilize a public key to encrypt a portion of an application token and a private key to decrypt the portion of the application token.

In some embodiments, the token service computer 770 may determine that a token container should be generated for the application token. The token service computer may receive an indication that a token container is needed in the enroll and provision request received, based on information provided by the service provider application 752 and/or the account management application 754. Alternatively, or additionally, the token service computer 770 may determine that a token container is needed based on looking up stored data associated with communication device 750 and/or account management application 754.

The token service computer 770 may execute operations to enroll the user and/or communication device in a token service. The enrollment may include, for example, issuing cryptographic keys or passwords.

The token service computer 770 generates the token container. The token service computer may generate a token container capable of holding a plurality of application tokens. As an example, the token container may include capability to store at least 100 twenty-byte long application tokens. The length of the application tokens may be specific to the various service providers. The token container may be generated to include a token container record associated with the application token. For example, the token container record may have the format: length of subsequent data (1 byte), program identifier (4 bytes), time interval in minutes (2 bytes), and application token (1-250 bytes). The token container may be associated with an identifier (e.g., such as a sixteen digit number unique to the token container). The token container may also be specifically formatted for the service provider 750, and other token containers for other service providers may be formatted the same or differently.

The token service computer 770 may further execute operations for modifying the application token. The token service computer 770 may cryptographically sign the application token using a key of the token service computer 770. The token service computer 770 may further modify the application token to be useable by the account management application 754. The token service computer 770 may, for example, convert the application token from a first format to a second format. Alternatively, or additionally, the token service computer 770 may add or modify header information associated with the application token.

At step S712, token service computer 770 may provision the account token to the account management application 754. The token service computer 770 may transmit the account token to the account management application. The token service computer 770 may transmit the token container with the application token (e.g., the application token is stored in the token container). The account management application may receive and store the application token in the token container in the account management application. The application token or supplemental data associated with the application token can include a container identifier, which may identify the token container which will store the application token.

In some embodiments, the token service computer 770 may send a notification to the service provider computer 760 to indicate that communication device 750 has been provisioned with the application token.

Figure 8:
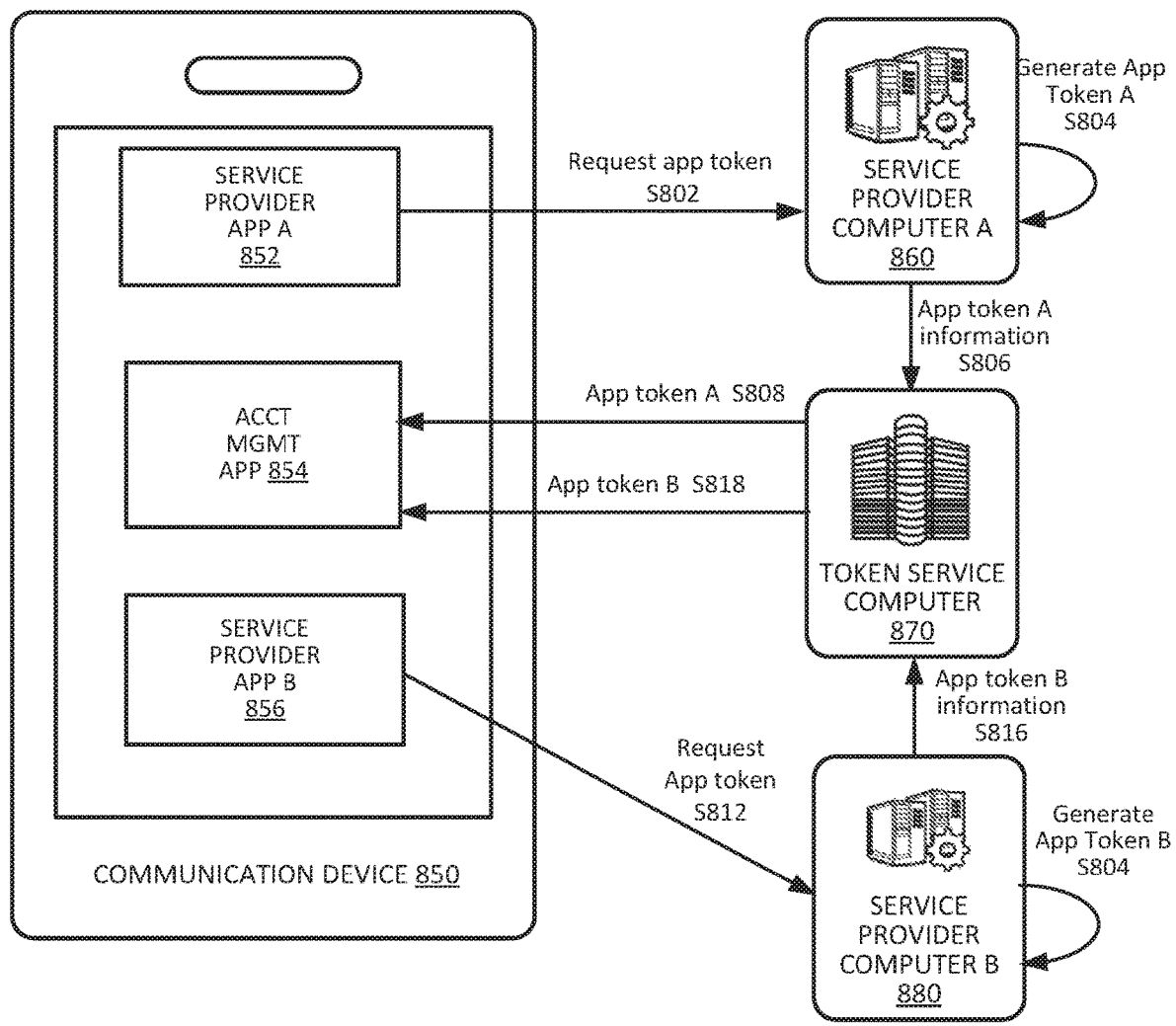
FIG. 8 illustrates another application token provisioning process, according to some embodiments.

FIG. 8 illustrates another application token provisioning process 800, according to some embodiments. Communication device 850 may have installed therein an account management application 854 such as a mobile wallet application. Communication device 850 further includes service provider application A 852 and service provider application B 856. The application token provisioning process 800 can be a subsequent provisioning event, after the first provisioning (e.g., as described above with respect to FIG. 7).

Initially, a user may interact with communication device 850 to purchase an application token. The user may select an application token for purchase, e.g., via service provider application 852 and/or a web browser in communication with a service provider website. Service provider application A may determine whether an application token and/or token container exists on the communication device 850. Service provider application A 852 may, for example, query the account management application 854 to determine whether account tokens have previously been provisioned and/or whether a token container is currently stored on the account management application 854. Alternatively, or additionally, service provider application A 852 may search records stored within the service provider application A 852 and/or service provider computer A 860.

At step S802, service provider application A 852 may transmit a request for an application token to service provider computer A 860. The request may include information pertaining to the application token (e.g., one ticket for rail travel from Munich to Prague). The request may include payment information such as an account number to use to pay for the application token. In some embodiments, the request may further include an indication that this is a subsequent application token request. The request may be transmitted over a wired or wireless connection between the communication device 850 and the service provider computer A 860.

At step S804, service provider computer A 860 may verify the user, communication device 850, and/or payment information, and generate the application token. Application token A may, for example, be generated in the form of a digital ticket. Application token A may include information about the access to grant (e.g., one rail journey, access to a particular concert, access to a particular building, etc.). Application token A may include information characterizing service provider A (e.g., the application token may include a header specifying that service provider A is Portland Metropolitan Transit Authority). Application token A may be in a format and/or size specific to service provider A.

At step S806, service provider computer A 860 transmits application token information to the token service computer 870. The service provider computer A 860 may transmit, to the token service computer 870, information about this particular application token (e.g. a particular journey or event). The service provider computer A 860 may further transmit information about the previously provisioned token container (e.g., an identifier of the token container).

The token service computer 870 receives the application token information and prepares the application token information to transmit to the account management application 854. In some embodiments, the token service computer 870 executes operations for modifying the application token to be useable by the account management application 854. The token service computer 870 may, for example, convert the application token from a first format to a second format. Alternatively, or additionally, the token service computer 870 may add or modify header information associated with the application token. The token service computer 870 may further cryptographically sign the application token using a key of the token service computer 870.

At step S808, the token service computer 870 transmits the application token (application token A) to the account management application 854. The token service computer 870 may transmit application token A with information indicating that application token A should be stored to the token container with a particular identifier (e.g., 123459789). The account management application 854 may receive and store application token A in the token container in the account management application 854.

In some embodiments, the token service computer 870 may send a notification to service provider computer A 860 to indicate that communication device 850 has been provisioned with application token A.

Subsequently, the user may interact with an application associated with another service provider, service provider B, to purchase a second application token. For example, application token A may be for the first leg of a rail journey purchased via a first rail provider and application token B may be for the second leg of the rail journey purchased via a second rail provider. As another example, application token A may be an airline ticket for Transylvanian Airlines purchased on the Transylvanian Airlines application. The user may subsequently purchase another Transylvanian Airlines ticket via a ticket aggregator application. The user may initiate purchase of application token B via service provider application B 856. Alternatively, or additionally, the user may initiate purchase of the application token via a service provider website (e.g., via a web browser application on the communication device 850).

At step S812, service provider application B 856 may transmit a request for an application token to service provider computer B 880. The request may include information pertaining to the application token. The request may include payment information such as an account number to use to pay for the application token. In some embodiments, the request may further include an indication that this is a subsequent application token request. The request may be transmitted over a wired or wireless connection between the communication device 850 and the service provider computer B 880.

At step S814, service provider computer B 860 may verify the user, communication device 850, and/or payment information, and generate application token B. Application token B may, for example, be generated in the form of a digital ticket. Application token B may include information about the access to grant (e.g., one rail journey, access to a particular concert, access to a particular building, etc.). Application token B may include information characterizing service provider B (e.g., application token B may include a header specifying that the service provider is Travel Corp.). Application token B may be in a format and/or size specific to service provider B. In some embodiments, issuing and/or verifying the application token may involve communication with another service provider. For example, if service provider B is a ticket selling application, and service provider A is a concert venue, service provider B may coordinate purchase of a ticket from the concert venue/service provider A prior to issuing application token B.

At step S816, service provider computer B 880 transmits application token information to the token service computer 870. The service provider computer B 880 may transmit, to the token service computer 870, information about this particular application token (e.g. a particular journey or event). The service provider computer B 880 may further transmit information about the previously provisioned token container (e.g., an identifier of the token container).

The token service computer 870 receives the application token information and prepares the application token information to transmit to the account management application 854. In some embodiments, the token service computer 870 executes operations for modifying the application token to be useable by the account management application 854. The token service computer 870 may, for example, convert the application token from a first format to a second format. Alternatively, or additionally, the token service computer 870 may add or modify header information associated with the application token. The token service computer 870 may further cryptographically sign the application token using a key of the token service computer 870.

At step S818, the token service computer 870 transmits the application token (application token B) to the account management application 854. The token service computer 870 may transmit application token B with information indicating that application token B should be stored to the token container with a particular identifier (e.g., 123459789). The account management application 854 may receive and store the application token in the token container in the account management application.

In some embodiments, the token service computer 870 may send a notification to service provider computer B 880 to indicate that communication device 850 has been provisioned with application token B.

Figure 9:
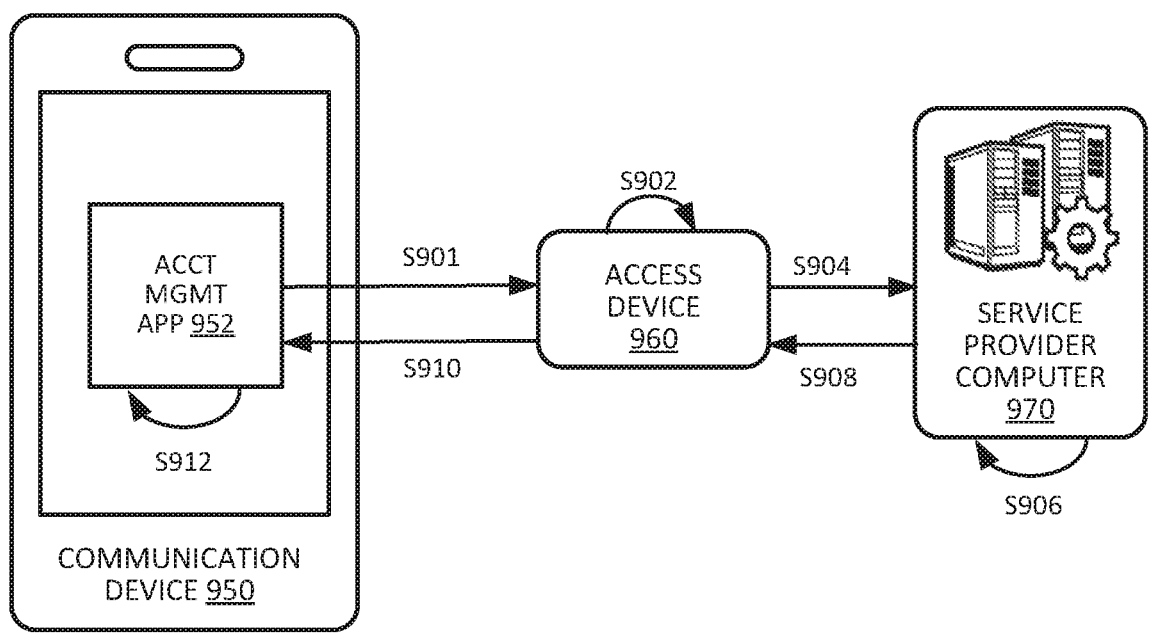
FIG. 9 illustrates an application token redemption process, according to some embodiments.

FIG. 9 illustrates an application token redemption process, according to some embodiments. A user may redeem an application token (as provisioned as described above with respect to FIGS. 7 and/or 8) using a communication device 950. The communication device may interact with an access device 960 to redeem the application token, and the access device 960 may communicate with a service provider computer 970 on the back end. The access device 960 may, for example, be a ticket scanner at a transit agency or event venue. As another example, the access device 960 may be a POS device. As illustrated in FIG. 9, an account management application 952 is used to redeem the application token. In other embodiments, the application token may be redeemed via a service provider application.

At step S901, the account management application 952 interacts with the access device 960 to redeem the application token. The interaction may include, for example, the user tapping the communication device 950 to the access device. The account management application 952 may initiate a communication session with the access device. The communication session may be via near-field communication (e.g., using the EMV contactless specification). Alternatively, or additionally, the account management application 952 may interact with the access device 960 via any suitable wired or wireless form of communication. Based on the interaction, the account management application may transmit, to the access device 960, an authorization request for the application token.

The account management application 952 may transmit all or a portion of the stored application tokens to access device 960. In some embodiments, the user may initially select an appropriate application token (e.g., by selecting one of several tickets displayed via the account management application 952). The account management application 952 may then push the selected application token to the access device 960. Alternatively, the account management application may identify one or more appropriate application tokens to push to the access device 960. For example, the access device transmits an access device identifier to the account management application 952. The access device identifier indicates that the access device is operated by Super Tix. Accordingly, the account management application 952 identifies four application tokens which are identified as being associated with Super Tix, and sends the four identified application tokens to the access device. As another example, the account management application 952 may transmit the entire token container, and all application tokens therein, to the access device 960.

In some embodiments, the account management application 952 and/or access device may further process event specific and/or device specific data for use in validation of the present and/or future redemptions. For example, the access device 960 may provide, to the account management application one or more of a timestamp, a program identifier, a location name, and/or a terminal identifier. The account management application 952 may further generate a timestamp for comparison with the received timestamp.

In some embodiments, the account management application 952 may retrieve a cryptographic key (e.g., a private key) stored on the communication device 950, and may then use the retrieved key to sign the event specific or the device specific data. This can be used at a later time by the service provider computer 970 to verify that the communication device 950 originated the request. In some embodiments, the verification may be performed by the service provider computer 970 by using a public key associated with the private key that signed the event or device specific data. For example, in some embodiments, the event specific data may be a nonce, and the nonce may be signed by a private key residing in a secure element on the communication device 950. The account management application 952 may generate the nonce and may retrieve the private key from a secure element on the communication device 950 to sign it. The signed nonce may then be provided to the service provider computer 970 alone or with the nonce. This will allow the service provider computer 970 to confirm that the account management application 952 and the access device 960 interacted via communication device and that the redemption request is coming from the correct account management application.

At step S902, the access device 960 receives and analyzes one or more application tokens. In the event the access device 960 receives multiple application tokens, the access device 960 may identify an access token for redemption. The access device 960 may identify the access token for redemption based on comparing parameters associated with the access device with application token data. For example, the access device can be in London. If the are four train tickets in the account management application 952 received, and one of the train tickets is associated with the origin of London, then the access device 960 may use application token details to identify and select the application token associated with the origin of London for redemption.

In some embodiments, the access device 960 validates the application token offline. The application token may have been cryptographically signed by the token service computer which issued the application token. The access device 960 may have a stored cryptographic key of the token service computer which issued the application token. The access device 960 may use the stored cryptographic key and a predetermined algorithm to validate the cryptographic signature of the token service computer, thereby validating the application token without the need to query other computers. This is particularly useful in situations where the application token must be validated quickly, or without internet connectivity. For example, at a transit fare gate, it is desirable to quickly validate a ticket so that the user can proceed through quickly. Alternatively, or additionally, the access device 960 may validate the application token using the device and/or event data, as described below with respect to step S906. Alternatively, or additionally the access device 960 may forward the request to be validated by the service provider computer 970.

In some embodiments, at step S904, the access device 960 forwards the application token authorization request to the service provider computer 970. The access device 960 may forward the application token authorization request as received. Alternatively, the access device 960 may modify the application token authorization request prior to sending it to the service provider computer 970 (e.g., by selecting one of a set of received application tokens, modifying a token state, and/or the like). If the access device 906 has already validated the application token authorization request, then the access device 906 may include data indicating that the request has been validated.

At step S906, the service provider computer 970 receives and processes the application token authorization request. The service provider computer 970 may validate the received application token authorization request. In some embodiments, the access device 960 may have already validated the application token request, in which case, the service provider computer 970 may confirm or note the validation. Alternatively, the service provider computer 970 may independently validate the application token. The service provider computer may, for example, validate a digital signature of the application token. As another example, the service provider computer 970 may compare the received application token to stored application tokens to perform validation. Upon validating the application token, the service provider computer 970 may modify a stored token state to note the application token as redeemed.

Further, the previously described signed device and/or event specific data can also be verified by the service provider computer 970. Device and/or event specific data can be obtained from the access device 960 and/or communication device 950. For example, in some embodiments, as noted above, the device and/or event specific data may be signed by an encryption key in a secure element in the communication device 950. The resulting digital signature may be verified by the service provider computer 970 using a corresponding encryption key (e.g., a public key) to ensure that the correct communication device 950 is requesting the redemption of the application token.

At step S908, the service provider computer 970 transmits an application token authorization response to the access device 960. The response may indicate whether the application token is valid. In some embodiments, step S908 may be omitted. For example, if the access device validated the application token offline, there may be no need for the access device to receive additional validation information from the service provider computer 970.

At step S910, the access device 960 transmits a response to the account management application 952. In some embodiments, the access device 960 may transmit the response within a same near-field communication session in which the request was received. The response may indicate whether the request has been validated (e.g., access to a location or resource should be granted) or not validated (e.g., the access should be refused). In the even the request/application token was validated, the access device may grant such access (e.g., by opening a gate or transmitting a notification to an operator (e.g., someone managing entry to a location). Step 910 may occur prior to steps 904-908 in the event the access device performed offline validation. Alternatively, the access device 960 may perform step 910 after steps 904-908 if the service provider computer 970 validated the application token.

At step S912, the account management application 952 may update a token state associated with the application token. In some embodiments, the account management application may immediately update the token state by marking the application token as "used" upon transmitting the request at S901. Alternatively, or additionally, the account management application 952 may update the token state based on information received in the response at S910.

Transit Environment

According to some embodiments, the enhanced tokenization system can be used in a transit environment. Transit environments may include mass transit ticketing and inter-city travel. Mass transit ticketing may have the characteristics that ticket prices do not vary, serves walk-in customers, has pay-as-you-go fare calculation, and is typically associated with urban metros with gate-in/gate-out facilities. Mass transit ticketing may use offline data authentication, and may employ contactless cards and mobile wallets, with low friction and high customer satisfaction. For inter-city travel, customers may want guaranteed seats (e.g., pre-paid booking), fares may fluctuate (e.g., early booking may reduce fare), and tickets may be higher value as compared to mass transit ticketing. Fare calculation can also be complex, and may consider whether it is a single or return, season pass, group discount, etc. Stations may also be ungated and may rely on ticket inspection.

Ticket purchase and display can be handled by a ticketing application associated with a service or application provider. In some embodiments, only some selected journeys may qualify for digital tickets and be processed by the tokenization system. The ticketing application may indicate which journeys qualify. The ticketing application may create a digital ticket container (token container) by push provisioning (if one does not already exist), and inform the transit back office to push tickets (e.g., in the form of application tokens and token states) to the digital token container of the consumer's communication device. The transit back office can add/update tickets in the token container by repeated re-personalization (e.g., updating the token state). The ticketing application can get updates from the transit back office showing which tickets are used, partially used, or unused. In some embodiments, tickets that are pushed to the token container can come from different sources such as purchases directly from the ticketing application, in-person purchase, or online purchase via a web site.

In some embodiments, the consumer may pull up the digital ticket container before tapping at a transit gate to prevent a default payment token from being charged for journey. A consumer may pull up the digital ticket on a mobile wallet application on the consumer's communication device, and perform a tap at the transit gate. The transit gate may read the token (e.g., can be sent as issuer discretionary data), and the communication device may write the transit gate data to the transaction log. The gate may validate the ticket and open to give the consumer access to the transit system. The transit gate may record a station ID on the transaction log (e.g., a station ID and timestamp can be recorded in the log). The transaction log can be used for pass back control and on-train validation. It should be noted that multiple valid tickets can exist at the same time within the digital token container on the communication device. In some embodiments, all valid tickets can be transmitted to the gate during tap (e.g., single ticket and season pass may exist at the same time), and the transit back office can apply rules to determine which ticket to mark as used. The digital tickets can be clipped (e.g., token state updated to partially used or used), but need not be deleted from the digital token container. In some embodiments, only an authenticated reader may be able to clip tickets (e.g., read, write, update the digital token container). In some embodiments, authenticated logging (e.g., encrypted logging) can be used to prevent fraud and protect privacy, but may add complexity (e.g., key management) to the system.

Digital ticketing tokenization as described herein encompasses the concept of using a token container for application tokens as a tap-and-pay ticket fulfillment mechanism. The token container can securely maintain ticket states, communicate with gate readers using contactless mechanism (e.g., near-field communication (NFC)), and allow a ticket issuing entity to dynamically personalize its properties (e.g., update the token state). A tap using a token container and/or application token may not result in a payment transaction, and may only result in a private communication between the gate and the ticket issuer (e.g., transit operator). Digital ticketing tokenization allows for instant ticket issuance, can be globally interoperable using contactless reader technology, provides better customer user experience than alternatives (paper tickets, QR codes, etc.), and can have low operational costs while being scalable and reliably under high loads.

Loyalty Environment

According to some embodiments, the enhanced tokenization system can also be employed to manage loyalty information stored in digital token containers. Loyalty information provided by the issuer can flow to the merchant as follows. Issuer may provide loyalty information optionally as part of token activation request (TAR) response. The token service computer may dynamically inject loyalty data into the token state during provisioning. The digital wallet application can be responsible for transmitting loyalty information to the terminal as part of a payment transaction. There can be variations among issuers with respect to the loyalty tags and sub-tags to be transmitted during the transaction. Each issuer may use proprietary tags and there can be variances in the number of tags used and content these tags carry. In some embodiments, the issuer provided loyalty data can be carried in the issuer discretionary data within the file control information (FCI) or issuer application data (IAD), which can have a variable length. The token service computer can place this data in the perso (and during re-perso) (e.g., token state update). The FCI issuer discretionary data can be provided to a terminal in response to a select application identifier command from the terminal, and IAD issuer discretionary data can be provided to a terminal in response to a get processing options command from the terminal.

Figure 10:
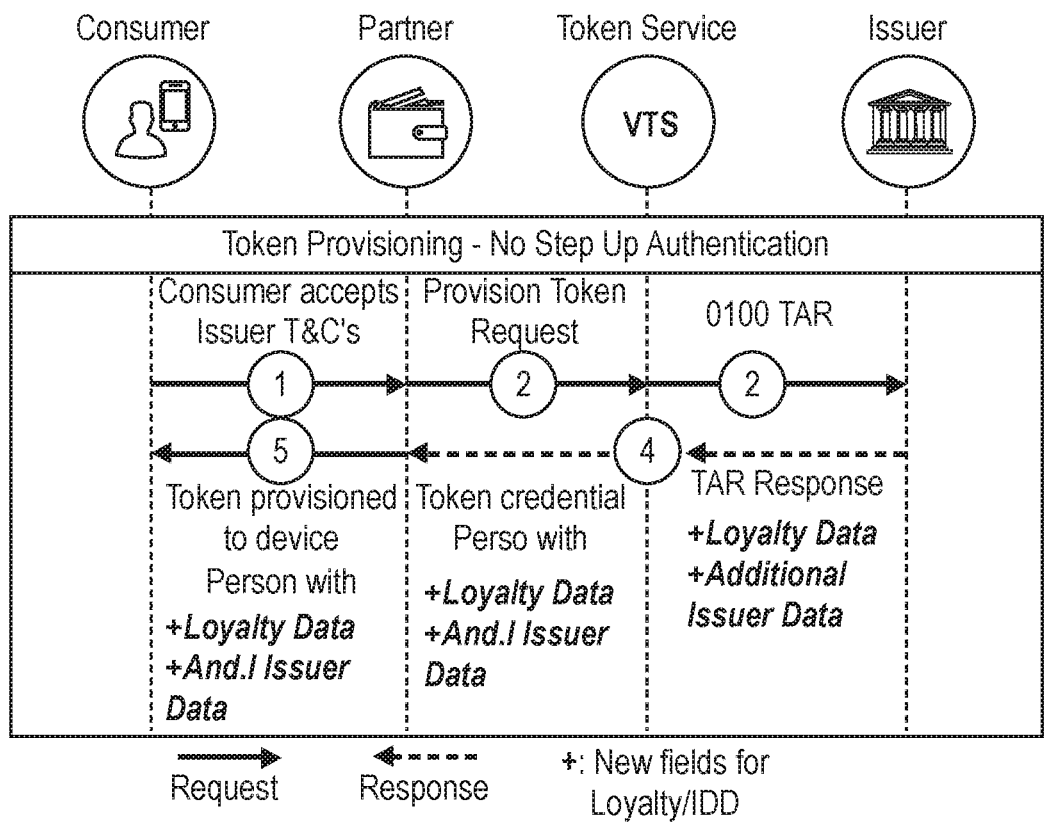
FIGS. 10-11 illustrate loyalty data update flows, according to some embodiments
Figure 11:
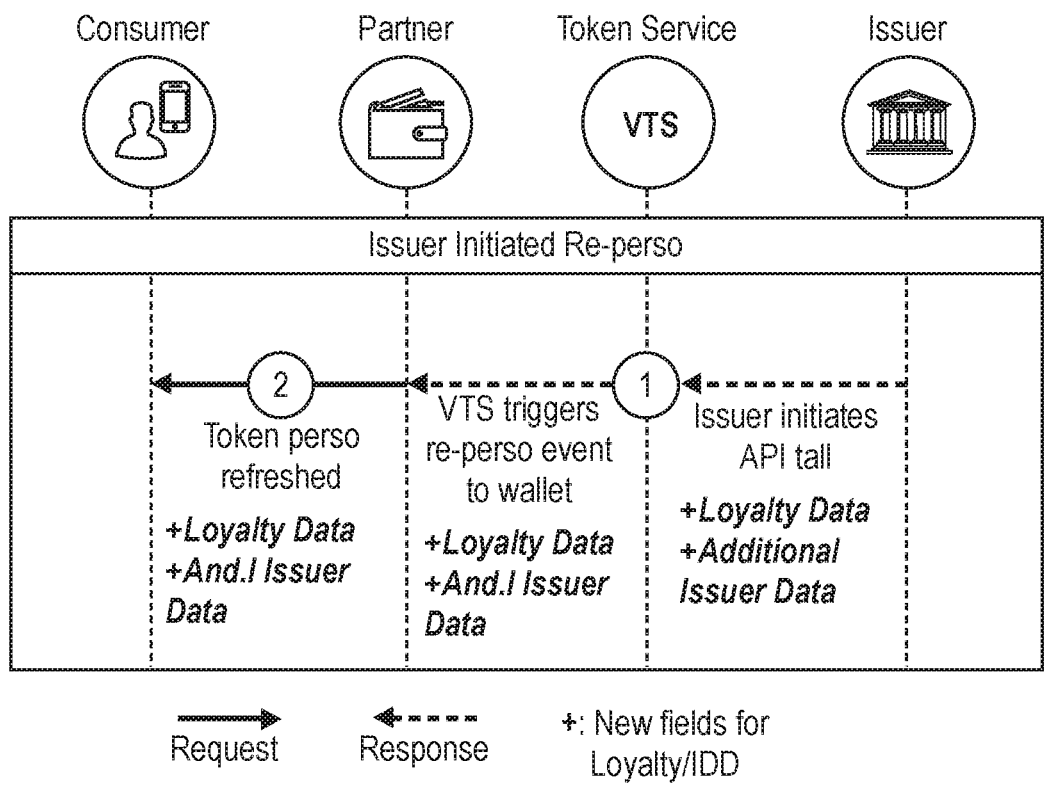

FIGS. 10 and 11 illustrate example loyalty operations. In these examples, an issuer (e.g., bank) generated loyalty data (e.g. for managing loyalty rewards). In other examples the loyalty data may be generated by service providers such as merchants, transit providers, etc.

FIG. 10 illustrates a loyalty data flow, according to some embodiments. In some embodiments, issuers can optionally pass back loyalty and additional issuer data in TAR responses. At a first step, a consumer may accept the issuer's terms and conditions on the wallet application. At a second step, the wallet application may trigger a provision token call to a token service computer. At a third step, the token service computer may send a token activation request (TAR) to the issuer. At a fourth step, the issuer may respond to the TAR and optionally pass back loyalty and additional issuer discretionary data. At a fifth step, the token service computer may inject loyalty and additional issuer provided data into token perso (e.g., token state) and returns token perso to the wallet application. At a sixth step, the wallet application provisions the token (and its token state) onto the consumer device.

FIG. 11 illustrates a loyalty data update flow, according to some embodiments. Issuers may have the ability to update loyalty (and other issuer discretionary data) where it changes through updates (e.g., replace/renew). This can be accomplished via issuer initiated re-perso (e.g., token state update). At a first step, the issuer may push updated loyalty information via an API call. At a second step, the token service computer may inject this information into token perso, and triggers re-perso call (e.g., token state update) to the wallet application. The wallet application may contact the token service computer to retrieve new perso for the token and refresh the perso (e.g., token state) stored in the wallet application.

Figure 12:
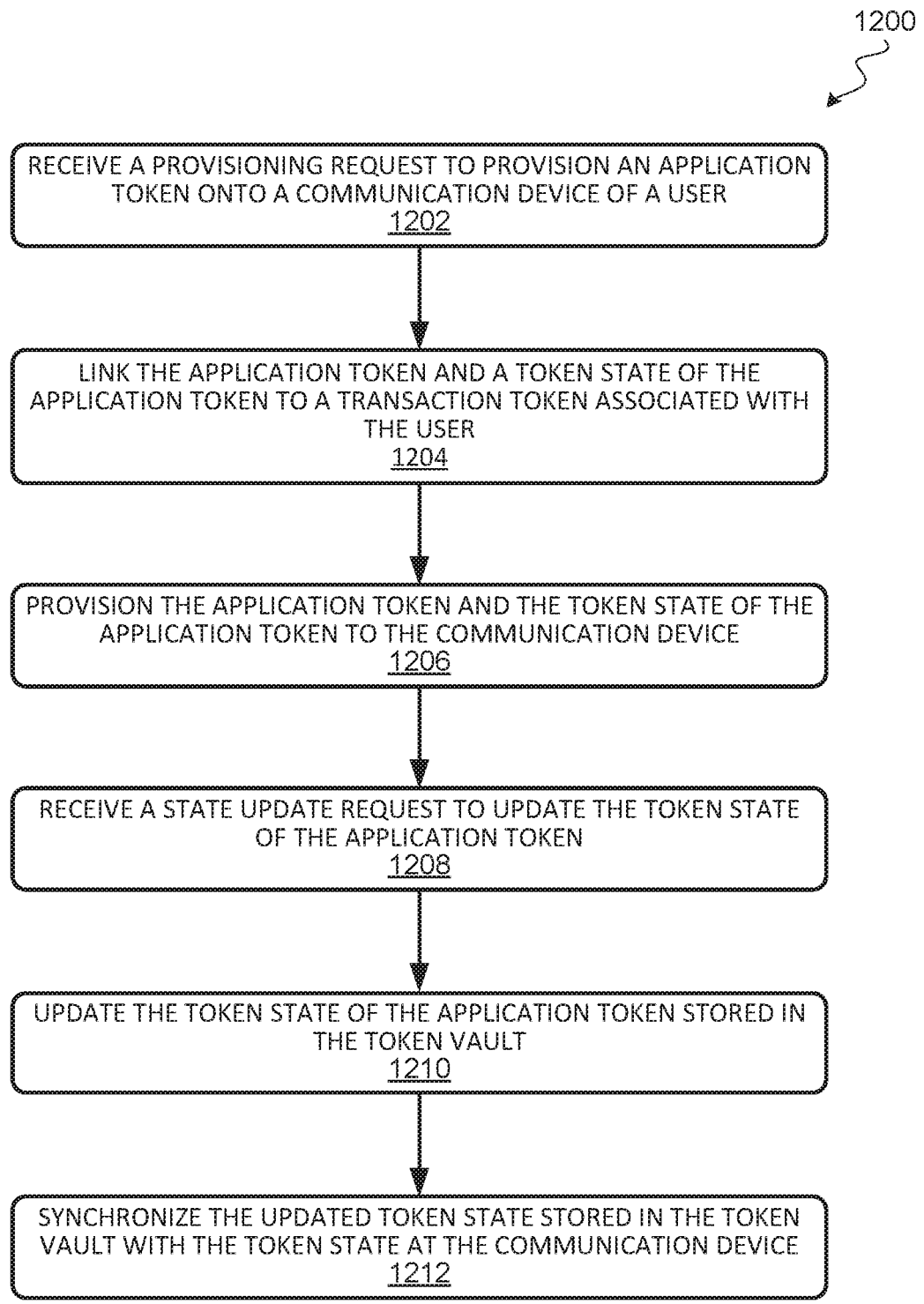
FIG. 12 illustrates a flow diagram of a process for managing application tokens and token states, according to some embodiments.

FIG. 12 illustrates a flow diagram of a process 1200 for managing tokens and token states, according to some embodiments. Process 1200 can be performed, for example, by a server computer associated with a token service computer. Process 1200 may begin at block 1202 by receiving a provisioning request from an application provider (e.g., ticketing entity, transit operator, merchant, etc.) to provision an application token onto a communication device of a user.

At block 1204, the application token and a token state of the application token can be linked to a transaction token associated with the user in a token vault. At block 1206, the application token and the token state of the application token can be provisioned to the communication device of a user. At block 1208, process 1200 may receive a state update request from the application provider to update the token state of the application token At block 1210, process 1200 may update the token state of the application token. The token state of the application token stored in the token vault. At block 1212, the updated token state stored in the token vault can be synchronized with the token state at the communication device. In some embodiments, the token state may be referred to as "perso" and may include usage information such as transit information and/or loyalty information.

Examples of Event Specific Data and Device Specific Data

The communication device and access device may track, store and analyze event specific data and/or device specific data. This data may be used to validate interactions, to monitor and prevent fraud. Further, in transit settings, it may be important to track when a user taps in and out of the access device (e.g., if an application token is based on a time period, such as a day pass). The following examples show types of event specific data and device specific data which the communication device and access device can be configured to manage.

Access Device

The access device may be capable of providing the following information to the account management application:
Timestamp—An accurate timestamp (5 bytes)
Timestamp Conversion Factor—A factor to convert to universal time (1 byte)
Program Identifier—A program identifier (4 bytes)
Period Number—A program assigned period (2 bytes)
Location Name—A unique program assigned location (20 bytes)
Terminal Identifier—A unique terminal (access device) identifier assigned to a specific location in the program (2 bytes)

It is the responsibility of the program operator to accurately maintain the above data. For example, in the case of a power failure or system reset, the timestamp must be synchronised and whenever a period expires, the period number must be incremented across all access devices in the system.

The access device should also be able to verify a signature provided by the account management application. The logic in the access device with respect to honouring a specific application token, or determining fraud is program-specific.

Communication Device

As a compliment to the access device's timestamp, the account management application may be able to retrieve a communication device universal timestamp (UTC). This can be achieved through a number of mechanisms:

If the device can get a global positioning system (GPS) signal, an app has access to the time in the GPS signal.
If the device has access to a network, it can get the cell network time or get the signed time from a number of services if data services are available.
If the device does not have access to a network or to a GPS signal there are still things that can be done as long as the app managed to get access to an accurate time since the last boot. The device keeps track of the time since the last boot, so this can be used along with the last accurate time received to calculate the current accurate time.

The account management application may include a log with the following capabilities:
The capability to log a minimum of 100 taps (40 bytes/tap=4000 bytes).
The format of a log record is as follows (defined length values with no separators):
Terminal (access device) Timestamp (5 bytes)—Terminal origin
Program Identifier (4 bytes)—Terminal origin
Period Number (2 bytes)—Terminal origin
Location Name (20 bytes)—Terminal origin
Terminal Identifier (2 bytes)—Terminal origin
Application Timestamp (5 bytes)—application origin
Status Word (2 bytes)—application origin Example Token Container Specifications The account management application may include a token container with the following capabilities:
The capability to store a minimum of 100, 20 byte long tickets (2500 bytes).
The maximum size of a record is 255 bytes-5 header bytes and 250 bytes of ticket blob (application token)

As the actual length of application tokens is program-specific, the actual number of application tokens that can be stored/maintained in the container will differ and it is the responsibility of the account management application and/or token service computer to ensure that garbage collection occurs whenever the container approaches its maximum capacity.

The format of a token container record may be as follows (length/value pair):
Length of subsequent data (1 byte)
Program Identifier (4 bytes)
Interval in minutes (2 bytes)
Ticket blob (application token) (1-250 bytes)

The techniques described herein have multiple advantages. By way of the token service computer, each individual service provider application need not integrate with each individual account management application. Thus, the functions performed by the token service computer simplify integrations and improve scalability.

Further, the cryptographic techniques described herein improve security in issuing and redeeming application tokens such as digital tickets. The data is signed and verified using secure keys. These cryptographic operations may further leverage interaction specific data. Accordingly, the system can ensure that the user/device attempting to gain access to a location or resource using an application is the user or device to which the application token was issued.

Additional advantages include offline verification capabilities. The access device can cryptographically verify that an application token is valid, without the need to communicate with a back end server. Accordingly the application token can be validated much faster than if messages were sent back and forth to a remote server. The application token can further be validated without internet connectivity. These improvements are particularly useful in transit settings when speed and portability are key.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   providing, by a first service provider application of a plurality of service provider applications on a communication device to a first service provider computer, a first request for a first application token;
   receiving, by the first service provider application on the communication device, a token container including an encrypted application token from the first service provider computer, the encrypted application token corresponding to the first application token, the token container associated with a container identifier and a token state associated with the encrypted application token, the container identifier and the token state maintained by a token service computer, the token state including at least one of a newly generated token, a redeemed token, or a value added token;
   receiving, by an account management application on the communication device from the first service provider application on the communication device, the token container, the token service computer in communication with the first service provider computer, the first application token;
   storing the encrypted application token in the token container in the account management application; and
   providing, by the account management application on the communication device to the token service computer, the encrypted application token.

2. The method of claim 1, wherein the token service computer and the first service provider computer have respective cryptographic keys of a cryptographic key pair.

3. The method of claim 2, wherein the cryptographic key pair is a symmetric key pair.

4. The method of claim 1, further comprising:
   providing, by a second service provider application on the communication device to a second service provider computer, a second request for a second application token;
   receiving, by the account management application on the communication device from the token service computer in communication with the second service provider computer, the second application token; and
   storing the second application token in the token container in the account management application.

5. A communication device comprising:
   a memory configured to store computer-executable instructions; and;
   a processor in communication with the memory configured to execute the computer-executable instructions to perform the steps of:
   providing, by a first service provider application of a plurality of service provider applications on the communication device to a first service provider computer, a first request for a first application token;
   receiving, by the first service provider application on the communication device, a token container including an encrypted application token from the first service provider computer, the encrypted application token corresponding to the first application token, the token container associated with a container identifier and a token state associated with the encrypted application token, the container identifier and the token state maintained by a token service computer, the token state including at least one of a newly generated token, a redeemed token, or a value added token;
   receiving, by an account management application on the communication device from the first service provider application on the communication device, the token container, the token service computer in communication with the first service provider computer, the first application token;
   storing the encrypted application token in the token container in the account management application; and
   providing, by the account management application on the communication device to the token service computer, the encrypted application token.

6. The communication device of claim 5, wherein the token service computer and the first service provider computer have respective cryptographic keys of a cryptographic key pair.

7. The communication device of claim 6, wherein the cryptographic key pair is a symmetric key pair.

8. The communication device of claim 5, the steps further comprising:
   providing, by a second service provider application on the communication device to a second service provider computer, a second request for a second application token;
   receiving, by the account management application on the communication device from the token service computer in communication with the first service provider computer, the second application token; and
   storing the second application token in the token container in the account management application.

9. A method comprising:

receiving, by a service provider computer from a service provider application of a plurality of service provider applications on a communication device, a request for an application token; and transmitting, by the service provider computer, a provisioning request to a token service computer to provision the application token to a token container on an account management application on the communication device, wherein transmitting the provisioning request comprises:

transmitting, by the service provider computer to the service provider application, an encrypted application token; and transmitting, by the service provider application to the token service computer, the provisioning request and the encrypted application token, the encrypted application token corresponding to the application token, the token container associated with a container identifier and a token state associated with the encrypted application token, the container identifier and the token state maintained by the token service computer, the token state including at least one of a newly generated token, a redeemed token, or a value added token.

10. The method of claim 9, wherein the token container is transmitted to the account management application with the application token.

11. The method of claim 9, wherein the service provider computer transmits the provisioning request directly to the token service computer.

12. The method of claim 9, wherein the token container is stored to the account management application prior to the receiving.

\* \* \* \* \*